US012552160B2

(12) United States Patent
Kiji

(10) Patent No.: US 12,552,160 B2
(45) Date of Patent: Feb. 17, 2026

(54) LIQUID EJECTION HEAD AND PRINTING DEVICE

(71) Applicant: RISO Technologies Corporation, Tokyo (JP)

(72) Inventor: Yasuhito Kiji, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 131 days.

(21) Appl. No.: 18/412,613

(22) Filed: Jan. 15, 2024

(65) Prior Publication Data

US 2024/0253348 A1 Aug. 1, 2024

(30) Foreign Application Priority Data

Jan. 26, 2023 (JP) ................................ 2023-010530

(51) Int. Cl.
*B41J 2/045* (2006.01)

(52) U.S. Cl.
CPC ....... *B41J 2/04588* (2013.01); *B41J 2/04541* (2013.01); *B41J 2/04573* (2013.01); *B41J 2/04581* (2013.01); *B41J 2/04596* (2013.01)

(58) Field of Classification Search
CPC ................ B41J 2/04588; B41J 2/04541; B41J 2/04573; B41J 2/04581; B41J 2/04596
See application file for complete search history.

(56) References Cited

U.S. PATENT DOCUMENTS

| | | | | |
|---|---|---|---|---|
| 8,777,349 | B2 | 7/2014 | Tobita et al. | |
| 2014/0313253 | A1* | 10/2014 | Yanagisawa | B41J 2/04525 347/9 |
| 2023/0079595 | A1* | 3/2023 | Araki | B41J 2/0459 347/14 |
| 2023/0249455 | A1* | 8/2023 | Yoshida | B41J 2/04541 347/10 |
| 2023/0302793 | A1 | 9/2023 | Kiji | |

FOREIGN PATENT DOCUMENTS

| | | | | |
|---|---|---|---|---|
| DE | 60032268 | T2 * | 5/2007 | B41J 2/04593 |

OTHER PUBLICATIONS

U.S. Appl. No. 18/412,600, filed Jan. 15, 2024.
U.S. Appl. No. 18/412,604, filed Jan. 15, 2024.

* cited by examiner

*Primary Examiner* — Justin Seo
(74) *Attorney, Agent, or Firm* — Kim & Stewart LLP

(57) ABSTRACT

A liquid ejection head includes a nozzle plate including a nozzle that ejects a liquid, a pressure chamber that communicates with the nozzle, an actuator configured to vary a volume of the pressure chamber in response to a driving signal, and a drive circuit configured to generate the driving signal. The driving signal includes an ejection waveform for ejecting the liquid and causing: an expansion potential difference for expanding the volume of the pressure chamber, a contraction potential difference for contracting the volume of the pressure chamber, and one or more intermediate potential differences between the expansion potential difference and the contraction potential difference, and a cancellation waveform that includes a trapezoidal wave for suppressing residual oscillation after the ejection of the liquid.

16 Claims, 14 Drawing Sheets

FIG. 8

| WAVEFORM | LEADING DROP VOLUME (pL) | TOTAL EJECTION VOLUME (pL) | LEADING DROP / TOTAL EJECTION | EJECTION VOLTAGE (V) |
|---|---|---|---|---|
| tr=0.2 μs | 0.4 | 2.5 | 0.16 | 15.7 |
| Tm=0.46 μs | 1.1 | 3.3 | 0.33 | 19.0 |
| Tm=0.62 μs | 1.6 | 3.5 | 0.46 | 21.1 |
| Tm=0.77 μs | 1.8 | 3.4 | 0.53 | 21.9 |
| Tm=0.93 μs | 1.7 | 3.1 | 0.55 | 22.1 |
| Tm=1.08 μs | 1.3 | 2.8 | 0.46 | 21.4 |
| Tm=1.23 μs | 1.2 | 2.4 | 0.50 | 21.3 |
| Tm=1.39 μs | 1.3 | 2.7 | 0.48 | 23.3 |

LIQUID EJECTION HEAD AND PRINTING DEVICE

CROSS-REFERENCE TO RELATED APPLICATION

This application is based upon and claims the benefit of priority from Japanese Patent Application No. 2023-010530, filed on Jan. 26, 2023, the entire contents of which are incorporated herein by reference.

FIELD

Embodiments described herein relate generally to a liquid ejection head and a printing device.

BACKGROUND

In the related art, there is known a technique of controlling the timing of meniscus oscillation and suppressing satellite droplets by adjusting the rise time or fall time of a drive waveform supplied to a liquid ejection head for ejecting liquid. In such a liquid ejection head, residual oscillation occurs after the liquid is ejected. Therefore, a liquid ejection head capable of suppressing residual oscillation is desired.

DESCRIPTION OF THE DRAWINGS

FIG. 8 is an explanatory diagram illustrating a relationship between the drive waveform and an ejected liquid droplet in an example of the liquid ejection head.

DETAILED DESCRIPTION

Embodiments provide a liquid ejection head capable of suppressing residual oscillation.

According to one embodiment, a liquid ejection head, comprises a nozzle plate including a nozzle that ejects a liquid, a pressure chamber that communicates with the nozzle, an actuator configured to vary a volume of the pressure chamber in response to a driving signal, and a drive circuit configured to generate the driving signal. The driving signal includes an ejection waveform for ejecting the liquid and causing: an expansion potential difference for expanding the volume of the pressure chamber, a contraction potential difference for contracting the volume of the pressure chamber, and one or more intermediate potential differences between the expansion potential difference and the contraction potential difference, and a cancellation waveform that includes a trapezoidal wave for suppressing residual oscillation after the ejection of the liquid.

Figure 1:
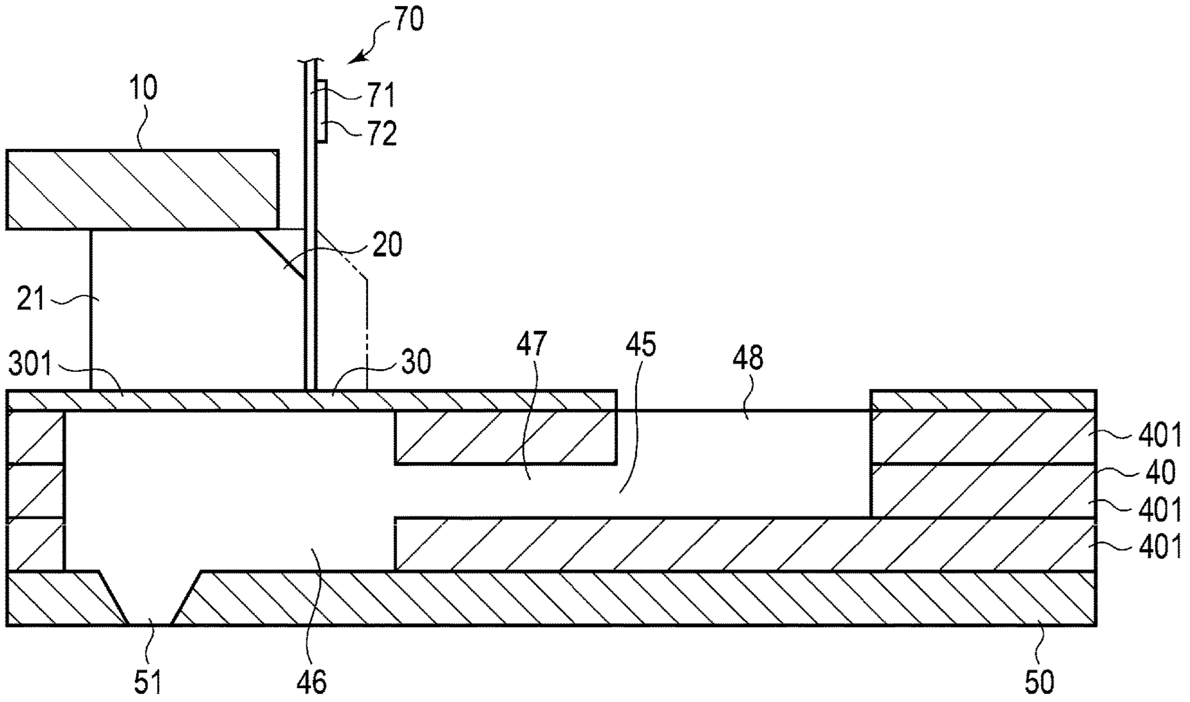
FIG. 1 is a cross-sectional view illustrating a part of a liquid ejection head according to an embodiment.
Figure 2:
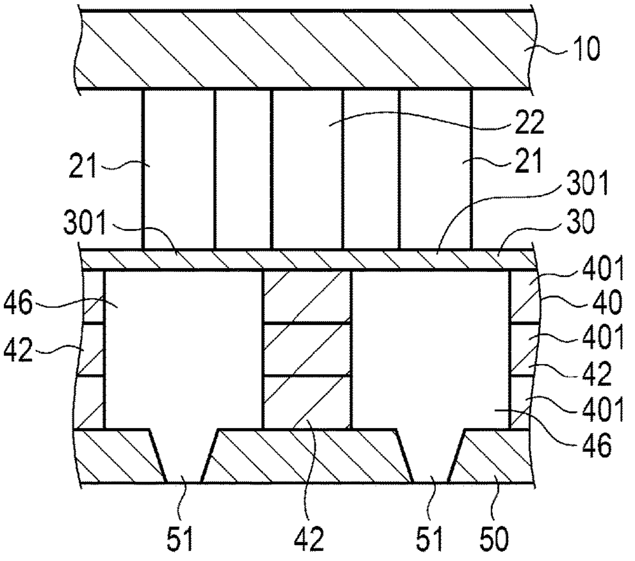
FIG. 2 is a cross-sectional view illustrating a part of the liquid ejection head.
Figure 3:
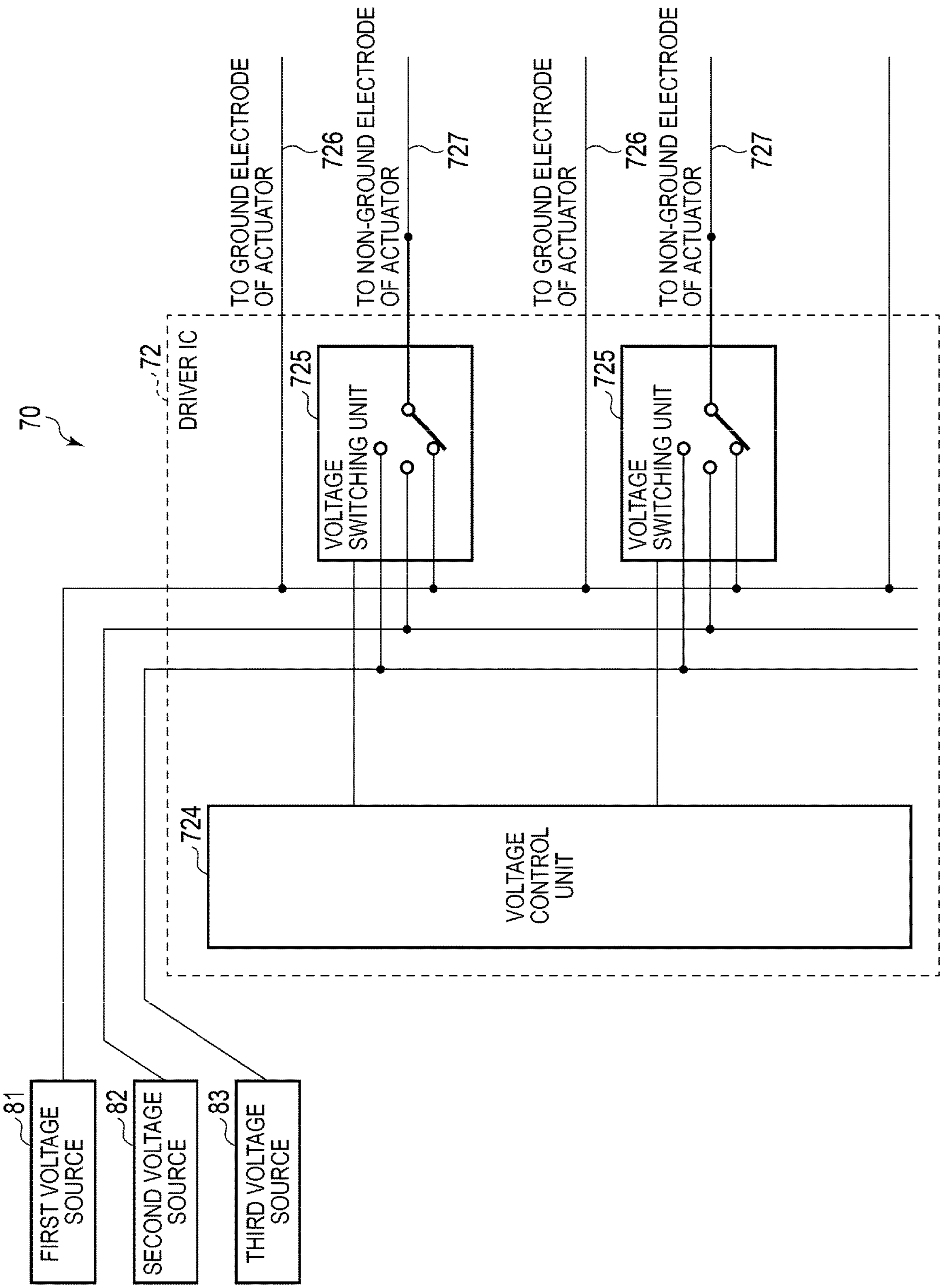
FIG. 3 is a block diagram schematically illustrating a configuration of a drive circuit for the liquid ejection head.
Figure 4:
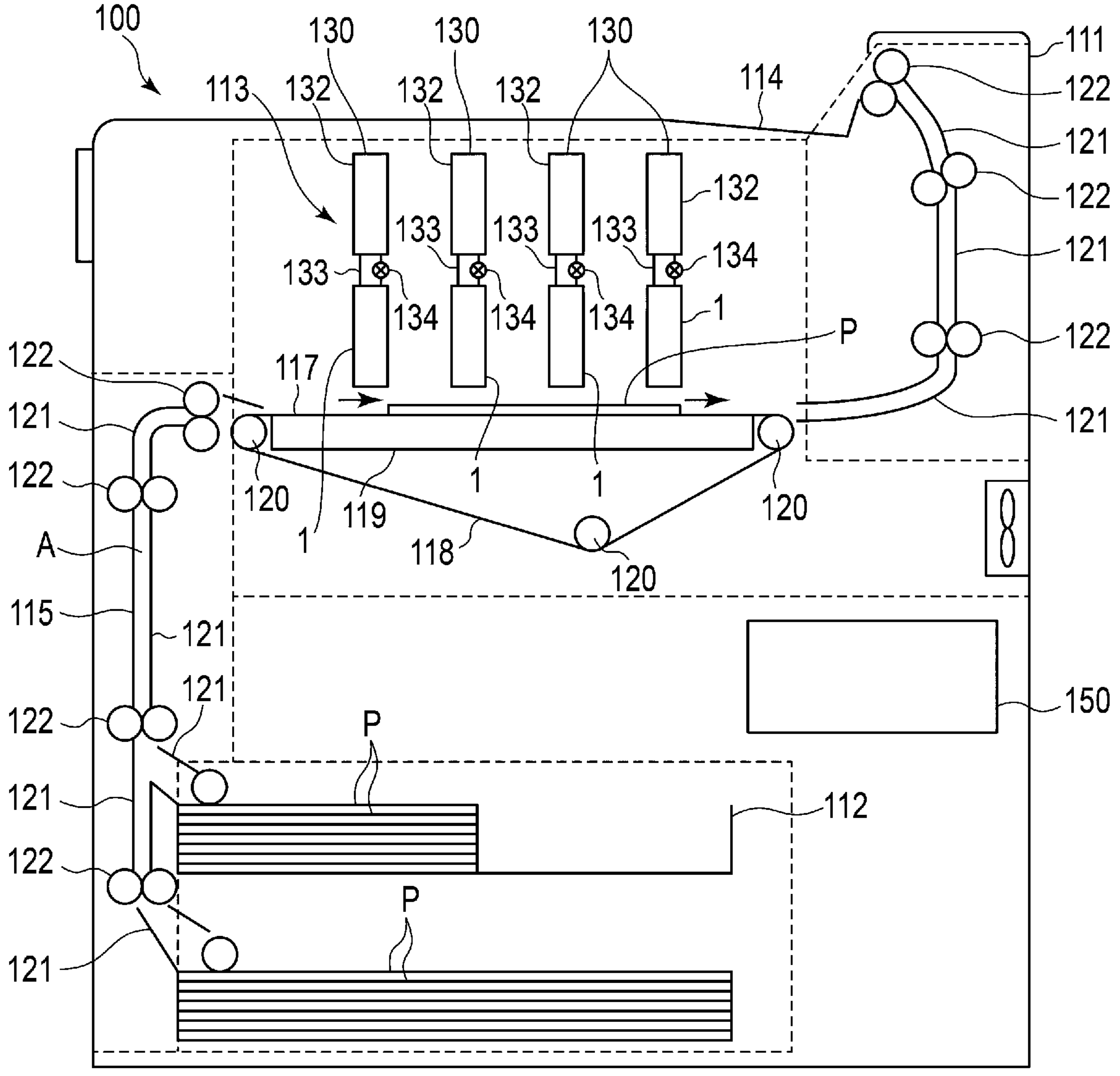
FIG. 4 is an explanatory diagram illustrating a configuration of a liquid ejection device using the liquid ejection head.
Figure 5:
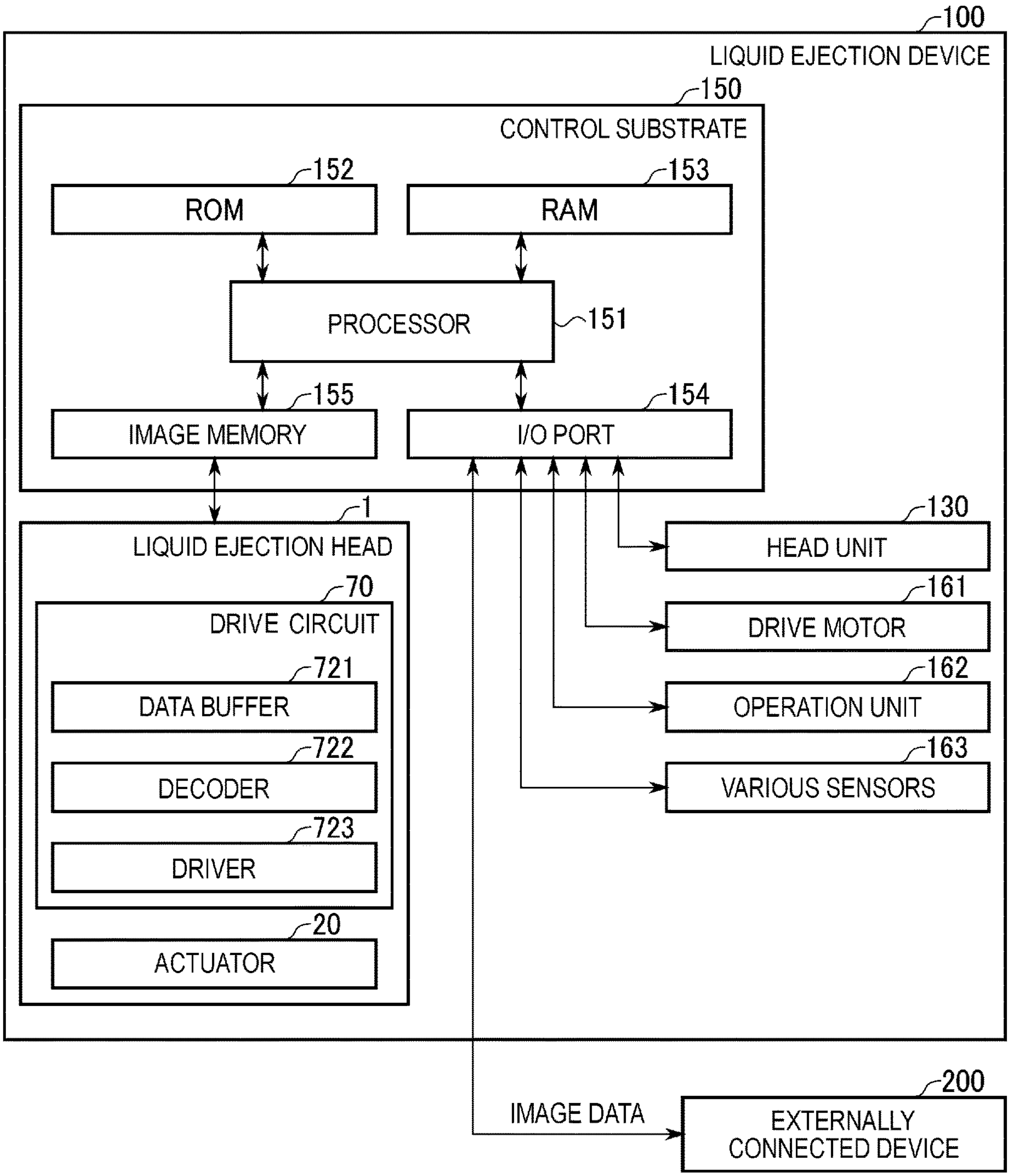
FIG. 5 is a hardware block diagram of the liquid ejection device.

Hereinafter, a configuration of a liquid ejection head 1 and a liquid ejection device 100 using the liquid ejection head 1 according to an embodiment is described with reference to FIGS. 1 to 5. FIGS. 1 and 2 are cross-sectional views each illustrating a part of the liquid ejection head 1 according an embodiment. FIG. 3 is a block diagram schematically illustrating a configuration of a drive circuit 70 for the liquid ejection head 1 according to an embodiment. FIG. 4 is an explanatory diagram illustrating a configuration of the liquid ejection device 100 using the liquid ejection head 1 according to an embodiment, and FIG. 5 is a hardware block diagram of the liquid ejection device 100 according to an embodiment. Note that in each figure, for the sake of explanation, components are illustrated in an enlarged, reduced, or omitted manner, as appropriate.

The liquid ejection head 1 is, for example, an inkjet head that ejects ink as a liquid. As illustrated in FIGS. 1 and 2, the liquid ejection head 1 includes a base 10, an actuator 20, a diaphragm 30, a channel plate 40, a nozzle plate 50 having a plurality of nozzles 51, and the drive circuit 70.

The base 10 is formed in, for example, a rectangular plate shape. The actuator 20 is joined to the base 10.

The actuator 20 is a piezoelectric member, for example, including a plurality of piezoelectric columns 21, non-driven piezoelectric columns 22 alternately arranged with the plurality of piezoelectric columns 21. The actuator 20 is formed in a comb teeth shape obtained by arranging the plurality of piezoelectric columns 21 and the plurality of non-driven piezoelectric columns 22 at predetermined intervals in one direction. For example, the actuator 20 is formed by: processing a groove by dicing a stacked piezoelectric member joined to the base 10 from an end surface on the opposite side of the base 10 side; and forming a plurality of piezoelectric members formed in a rectangular columnar shape with respect to one piezoelectric member at predetermined intervals. Also, the plurality of piezoelectric members formed are provided with electrodes or the like to configure the plurality of piezoelectric columns 21 and the plurality of non-driven piezoelectric columns 22 alternately arranged, as the piezoelectric member. That is, one end side (i.e., the diaphragm 30 side) of the actuator 20 is divided into a plurality of ends by the plurality of grooves formed, and the other end side (i.e., the base 10 side) is connected.

For example, the stacked piezoelectric member that forms the actuator 20 is formed by stacking and sintering a sheet-like piezoelectric material. As a specific example, as illustrated in FIGS. 1 and 2, the piezoelectric columns 21 and the non-driven piezoelectric columns 22 are, for example, stacked piezoelectric bodies as driving elements. The piezoelectric columns 21 and the non-driven piezoelectric columns 22 include a plurality of stacked piezoelectric layers, a plurality of internal electrodes formed on the main surface of each piezoelectric layer, and a plurality of external electrodes. Note that, as an example, the piezoelectric columns 21 and the non-driven piezoelectric columns 22 are the same configuration.

Each piezoelectric layer is made of a piezoelectric material such as PZT (lead zirconate titanate) or lead-free KNN (sodium potassium niobate) in a thin plate shape. The plurality of piezoelectric layers are stacked in the thickness direction and are adhered by sintering. Note that, here, the stacking direction of the plurality of piezoelectric layers is perpendicular to the arrangement direction of the plurality of piezoelectric columns 21 and the plurality of non-driven piezoelectric columns 22.

Each internal electrode is a conductive film made of a sinterable conductive material such as silver palladium and formed into a predetermined shape. The internal electrode is formed in a predetermined region of the main surface of each piezoelectric layer. Each of the plurality of internal electrodes has a polarity such that the polarities of any two adjacent internal electrodes in the arrangement direction are different.

Each external electrode is formed on the surfaces of the plurality of piezoelectric columns 21 and the plurality of non-driven piezoelectric columns 22 and is formed by collecting the end portions of the internal electrodes. The external electrode is formed of Ni, Cr, Au, or the like by a known method such as plating or sputtering. The plurality of external electrodes are arranged on different side portions of the plurality of piezoelectric columns 21 and the plurality of non-driven piezoelectric columns 22, respectively, and are configured to have different polarities. The external electrodes with different polarities may be routed to different regions of the same side portions of the plurality of piezoelectric columns 21 and the plurality of non-driven piezoelectric columns 22.

As an example, the plurality of external electrodes include individual electrodes respectively formed on the plurality of piezoelectric columns 21 and the plurality of non-driven piezoelectric columns 22 and common electrodes formed by connecting the plurality of piezoelectric columns 21 and the plurality of non-driven piezoelectric columns 22. The plurality of individual electrodes formed respectively on the plurality of piezoelectric columns 21 and the plurality of non-driven piezoelectric columns 22 are independently arranged. The common electrodes are, for example, grounded.

These external electrodes are connected, for example, to the drive circuit 70. For example, the individual external electrodes are connected to a control unit 150 as a driving unit via a driver 723 (described below) of the drive circuit 70 by wiring and are configured to be drive-controllable under the control of a processor 151.

The piezoelectric column 21 and the non-driven piezoelectric column 22 oscillate longitudinally along the stacking direction of the piezoelectric layers if a voltage is applied to the internal electrodes via the external electrodes. The longitudinal oscillation referred to here is, for example, "oscillation in the thickness direction defined by the piezoelectric constant d33". For example, as illustrated in FIG. 2, the plurality of alternately arranged piezoelectric columns 21 are arranged to correspond to pressure chambers 46 with the diaphragm 30 interposed therebetween, and the rest of the non-driven piezoelectric columns 22 are arranged at positions facing partition wall portions 42 with the diaphragm 30 interposed therebetween.

The piezoelectric columns 21 oscillate longitudinally by the application of the voltage and displace the diaphragm 30. That is, the piezoelectric columns 21 deform the pressure chambers 46. The non-driven piezoelectric columns 22 are arranged at positions facing the partition wall portions 42. No voltage is applied to the non-driven piezoelectric columns 22. That is, each piezoelectric column 21 forms the actuator that deforms the pressure chamber 46 when driven, and each non-driven piezoelectric column 22 forms a column. That is, the piezoelectric column 21 expands and contracts the pressure chamber 46 to vary the volume of the pressure chamber.

The diaphragm 30 is joined to one side of the piezoelectric layers of the plurality of piezoelectric columns 21 and 22 in the stacking direction, that is, on the surface on the nozzle plate 50 side. The diaphragm 30 is deformed, for example, by the driving of the piezoelectric columns 21. The diaphragm 30 is joined to the piezoelectric columns 21 and the non-driven piezoelectric columns 22 of the actuator 20.

The diaphragm 30 has a flat plate shape disposed, for example, so that the thickness direction is the stacking direction of the piezoelectric layers. The surface direction of the diaphragm 30 extends in the arrangement direction of the plurality of piezoelectric columns 21 and the plurality of non-driven piezoelectric columns 22. The diaphragm 30 is, for example, a metal plate. The diaphragm 30 includes a plurality of oscillation parts 301 that face each pressure chamber 46 and are individually displaceable. The diaphragm 30 is formed by integrally connecting the plurality of oscillation parts 301.

For example, the diaphragm 30 is formed in a flat plate shape of one sheet, and the regions joined to the piezoelectric columns 21 are individually displaced. The diaphragm 30 is formed by, for example, an SUS plate. In the diaphragm 30, folds or steps may be formed in portions adjacent to the oscillation parts 301 or between the oscillation parts 301 adjacent to each other so that the plurality of oscillation parts 301 easily displace.

The diaphragm 30 expands and contracts the pressure chambers 46 by displacement of parts arranged to face the corresponding piezoelectric columns 21 by the expansion and contract of the piezoelectric columns 21 occurring due to the longitudinal oscillation of the piezoelectric columns 21, thereby varying the volume of the pressure chambers 46.

In the diaphragm 30, the main surface of one side is joined to the actuator 20, and the main surface of the other side is joined to the channel plate 40. The pressure chamber 46 that can store ink is formed between the diaphragm 30 and the channel plate 40.

In the diaphragm 30, the main surface on one side faces each of the piezoelectric columns 21 and 22, and the main surface on the other side faces each of the pressure chambers 46 and the partition wall portions 42.

The channel plate 40 is joined to the diaphragm 30. The channel plate 40 is disposed between the nozzle plate 50 and the diaphragm 30. The channel plate 40 includes the plurality of partition wall portions 42. Also, the channel plate 40 forms a predetermined channel 45. The channel plate 40 forms the plurality of partition wall portions 42 and the predetermined channel 45, for example, by stacking a plurality of plates 401 that are partially open.

The plurality of partition wall portions 42 are arranged in the arrangement direction of the plurality of piezoelectric columns 21 and 22 and face the non-driven piezoelectric columns 22 via the diaphragm 30. The partition wall portions 42 separate between the plurality of pressure chambers 46 of the predetermined channel 45 and between a plurality of individual channels 47.

The predetermined channel 45 includes the plurality of pressure chambers 46 separated by the partition wall portions 42 of the channel plate 40, the plurality of individual channels 47 separated by the partition wall portions 42, and a common channel 48 that communicates with the plurality of individual channels 47.

The plurality of pressure chambers 46 are arranged in the arrangement direction of the plurality of piezoelectric columns 21 and the plurality of non-driven piezoelectric columns 22 and face the plurality of piezoelectric columns 21 via the diaphragm 30. The plurality of pressure chambers 46 arranged in one direction are separated by the partition wall portions 42. The plurality of partition wall portions 42 arranged between the plurality of pressure chambers 46 face the plurality of non-driven piezoelectric columns 22 via the diaphragm 30. The plurality of pressure chambers 46 are formed so that one side of the channel plate 40 is closed by the diaphragm 30 in the stacking direction of the piezoelectric layer, and the other side thereof is closed by the nozzle plate 50. In addition, the nozzles 51 formed in the nozzle plate 50 are arranged in the pressure chambers 46.

The plurality of pressure chambers 46 communicate with the common channel 48 via the individual channels 47. The pressure chamber 46 stores a liquid to be supplied from the common channel 48 via the individual channel 47 and ejects the liquid from the nozzle 51 by deforming the oscillation of the diaphragm 30 that partially forms the pressure chamber 46. The individual channel 47 connects the common channel 48 and the pressure chamber 46. The number of the individual channels 47 is same as the number of the pressure chambers 46. The channel cross-sectional shape of the individual channel 47 is different from the channel cross-sectional shape of the pressure chamber 46. The channel cross-sectional area of the individual channel 47 is smaller than the channel cross-sectional area of the pressure chamber 46. The common channel 48 is fluidly connected to the plurality of individual channels 47 and communicates with the pressure chambers 46 via each individual channel 47.

The nozzle plate 50 is formed, for example, by a metal such as SUS/Ni or a resin material such as polyimide. The nozzle plate 50 is joined to the channel plate 40 and covers the plurality of pressure chambers 46. The nozzle plate 50 includes the plurality of nozzles 51 formed at positions facing the plurality of pressure chambers 46 and penetrating in the thickness direction. A nozzle row is formed by the plurality of nozzles 51.

As illustrated in FIG. 5, the drive circuit 70 includes a data buffer 721, a decoder 722, and the driver 723. The data buffer 721 stores print data for each of the piezoelectric columns 21 and 22 in chronological order. The decoder 722 controls the driver 723 based on the print data stored in the data buffer 721 for each of the piezoelectric columns 21 and 22. The driver 723 outputs a driving signal for operating each of the piezoelectric columns 21 and 22 based on the control of the decoder 722. The driving signal is a voltage to be applied to each of the piezoelectric columns 21 and 22.

As a specific example, as illustrated in FIG. 1, the drive circuit 70 includes a wiring film 71 of which one end is connected to an external electrode, a driver IC 72 mounted on the wiring film 71, and a print wiring substrate mounted on the other end of the wiring film 71. For example, the driver IC 72 includes the data buffer 721, the decoder 722, and the driver 723. Note that a configuration in which a part of the data buffer 721, the decoder 722, and the driver 723 are included in the driver IC 72, and the rest part is included in the print wiring substrate or the like may be possible.

The drive circuit 70 drives the piezoelectric columns 21 by applying the driving voltage to the external electrode by the driver IC 72, varies the volume of the pressure chamber 46, and ejects the liquid droplet from the nozzles 51.

The wiring film 71 is connected to the plurality of individual electrodes and the common electrode. For example, the wiring film 71 is an anisotropic conductive film (ACF) fixed to the connection portion of the external electrode by thermocompression bonding or the like. The wiring film 71 is, for example, a chip on film (COF) on which the driver IC 72 is installed.

The driver IC 72 is connected to an external electrode via the wiring film 71. Note that the driver IC 72 may be connected to the external electrodes by another mechanism, such as an anisotropic conductive paste (ACP), a non-conductive film (NCF), and a non-conductive paste (NCP), instead of the wiring film 71.

The driver IC 72 generates a control signal and a driving signal applied to each of the piezoelectric columns 21 and 22 for operating the piezoelectric columns 21. The driver IC 72 generates a control signal for controlling a timing for ejecting ink and the selection of the piezoelectric column 21 for ejecting the ink according to the image signal input from the control unit 150 of the liquid ejection device 100. Also, the driver IC 72 generates a voltage to be applied to the piezoelectric column 21 according to the control signal, that is, a driving signal. If the driver IC 72 applies the driving signal to the piezoelectric column 21, the piezoelectric column 21 drives by displacing the diaphragm 30 and varying the volume of the pressure chamber 46 as being expanded and contracted. Accordingly, the ink filled in the pressure chamber 46 occurs pressure oscillation. Due to the pressure oscillation, the ink is ejected from the nozzles 51 provided in the pressure chambers 46. Note that the liquid ejection head 1 may realize gradation expression by changing the amount of ink droplets that land on one pixel. In addition, the liquid ejection head 1 may change the amount of the ink droplet that lands on one pixel by changing the number of times of the ejection of the ink.

Next, as illustrated in FIG. 3, an example of the drive circuit 70 is described. The drive circuit 70 includes, for example, a voltage control unit 724 and voltage switching units 725 in the same number as the number of the pressure chambers 46 in the driver IC 72. However, in FIG. 3, two voltage switching units 725 are illustrated, and the other voltage switching units 725 are not illustrated.

The drive circuit 70 is connected to a first voltage source 81, a second voltage source 82, and a third voltage source 83. The drive circuit 70 applies the voltage supplied from the first voltage source 81 to each wiring electrode 726. Note that the drive circuit 70 applies the voltage supplied from the first voltage source 81, the second voltage source 82, and the third voltage source 83 selectively to each wiring electrode

727. Here, if the actuator 20 is a stacked PZT, the actuator 20 is deteriorated in case of application of bipolar voltage. Therefore, the voltage supplied by the first voltage source 81, the second voltage source 82, and the third voltage source 83 is the ground voltage and one of positive and negative polarities with respect to the ground voltage.

The output voltage of the first voltage source 81 is, for example, the ground voltage, and the voltage value thereof is V0 (V0=0 [V]). Also, the voltage value indicated by the output voltage of the second voltage source 82 is V1. Note that the voltage value V1 is the voltage higher than V0. The voltage value indicated by the output voltage of the third voltage source 83 is, for example, V2. For example, the voltage value V2 is a voltage higher than V0 and lower than V1.

A wiring electrode 726 is connected to a common electrode as the ground electrode of the actuator 20. The plurality of wiring electrodes 727 are connected to individual electrodes as non-ground electrodes of the actuator 20, respectively.

The voltage control unit 724 is connected to each of the plurality of voltage switching units 725. The voltage control unit 724 outputs a command indicating which voltage source of the first voltage source 81, the second voltage source 82, and the third voltage source 83 is to be selected, to each of the voltage switching units 725. For example, the voltage control unit 724 receives an image signal from the control unit 150 and determines a switch timing of the voltage source in each voltage switching unit 725. Also, the voltage control unit 724 outputs a command for selecting any one of the first voltage source 81, the second voltage source 82, and the third voltage source 83 to the voltage switching unit 725 at a determined switch timing. The voltage switching unit 725 switches the voltage source connected to the wiring electrode 727 according to the command from the voltage control unit 724.

The voltage switching unit 725 is, for example, a semiconductor switch. The voltage switching unit 725 connects any one of the first voltage source 81, the second voltage source 82, and the third voltage source 83 to the wiring electrode 727 under the control of the voltage control unit 724. However, the internal electrode having a polarity different from the piezoelectric column 21 is connected to the wiring electrode 726 and the wiring electrode 727 via an external electrode (common electrode and individual electrode).

The drive circuit 70 inputs a drive waveform having at least three types of potential or voltage differences as the driving signal between the electrodes of the actuator 20 by switching the connection wiring between the voltage sources 81, 82, and 83 and the actuator 20 using the switching circuit including the voltage control unit 724 and the plurality of voltage switching units 725. Here, the drive waveform includes an ejection waveform for ejecting a liquid droplet by the actuator 20 and a cancellation waveform for cancelling a residual waveform generated in the pressure chamber 46 driven by the input of the ejection waveform. Note that in the present embodiment, the potential difference other than the largest potential difference and the smallest potential difference is referred to as an intermediate potential difference.

The print wiring substrate is a printing wiring assembly (PWA) on which various electronic components and connectors are mounted. The print wiring substrate is connected to the control unit 150 of the liquid ejection device 100.

Next, an example of the liquid ejection device 100 including the liquid ejection head 1 is described with reference to FIGS. 4 and 5. The liquid ejection device 100 is, for example, an inkjet printing device. The liquid ejection device 100 includes a housing 111, a medium supply unit 112, an image forming unit 113, a medium discharge unit 114, and a conveyance device 115. Also, the liquid ejection device 100 includes the control unit 150.

The liquid ejection device 100 performs image forming process on paper P by ejecting liquid such as ink while conveying, for example, the paper P as a printing medium that is an ejection target along a predetermined conveyance path A from the medium supply unit 112 to the medium discharge unit 114 via the image forming unit 113.

The housing 111 provides the outer shell of the liquid ejection device 100. A discharge port that discharges the paper P to the outside is provided at a predetermined portion of the housing 111.

The medium supply unit 112 includes a plurality of paper feed cassettes in which a plurality of sheets of paper P of various sizes is stacked and held.

The medium discharge unit 114 includes a paper discharge tray that holds the paper P discharged from the discharge port.

The image forming unit 113 includes a support unit 117 that supports the paper P and a plurality of head units 130 arranged to face the upper side of the support unit 117.

The support unit 117 includes a conveyance belt 118 that is formed in a loop shape in a predetermined region for image formation, a support plate 119 that supports the conveyance belt 118 from the back side, and a plurality of belt rollers 120 that are provided on the back side of the conveyance belt 118.

The support unit 117 conveys the paper P downstream by moving the conveyance belt 118 at a predetermined timing by the rotation of the belt rollers 120 together with supporting the paper P on the holding surface that is the upper surface of the conveyance belt 118 during the image formation.

The head units 130 include a plurality of liquid ejection heads 1, a plurality of ink tanks 132 as the liquid tanks mounted on the liquid ejection heads 1, connection channels 133 that connect the liquid ejection heads 1 and the ink tanks 132, and supply pumps 134.

According to an embodiment, a plurality of head units 130 are provided. The head units 130 use ink of different colors. For example, as the plurality of head units 130, the liquid ejection heads 1 of four colors of cyan, magenta, yellow, and black, and the ink tanks 132 that contain ink of respective colors are provided. Each of the ink tanks 132 is connected to the common channel 48 of the corresponding liquid ejection head 1 by the connection channel 133.

In addition, negative pressure control devices such as pumps (not illustrated) are connected to the ink tanks 132. Also, the ink supplied to each nozzle 51 of the liquid ejection head 1 is formed into a meniscus having a predetermined shape by negative pressure control of the inside of the ink tanks 132 by the negative pressure control device according to the water head value of the liquid ejection heads 1 and the ink tanks 132.

The supply pump 134 is, for example, a liquid feed pump such as a piezoelectric pump. The supply pump 134 is provided in a supply channel. The supply pump 134 is connected to the control unit 150 by wiring and controlled by the control unit 150. The supply pump 134 supplies the liquid to the liquid ejection head 1.

The conveyance device 115 conveys the paper P along the conveyance path A from the medium supply unit 112 to the medium discharge unit 114 via the image forming unit 113.

The conveyance device 115 includes a plurality of guide plate pairs 121 arranged along the conveyance path A and a plurality of conveyance rollers 122.

The plurality of guide plate pairs 121 each include a pair of plate members arranged to face each other with the conveyed paper P interposed therebetween and guide the paper P along the conveyance path A.

The conveyance rollers 122 send the paper P downstream along the conveyance path A by being rotated and driven by the control of the control unit 150. Note that sensors for detecting the conveyance state of the paper P are arranged at each location along the conveyance path A.

The control unit 150 is, for example, a control substrate. The processor 151, a read only memory (ROM) 152, a random access memory (RAM) 153, an I/O port 154 that is an input and output port, and an image memory 155 are mounted on the control unit 150.

The processor 151 is a processing circuit such as a central processing unit (CPU) that is a controller. The processor 151 controls the head units 130, a drive motor 161, an operation unit 162, various sensors 163, and the like provided in the liquid ejection device 100 via the I/O port 154. The processor 151 transmits the print data stored in the image memory 155 to the drive circuit 70 in the drawing order.

The ROM 152 stores various programs. The RAM 153 temporarily stores various kinds of variable data, image data, and the like. Note that the ROM 152 and the RAM 153 are examples of storage media and may be other storage media as long as the storage media can store various programs or data. The I/O port 154 is an interface circuit that inputs data from the outside such as an externally connected device 200 and outputs data to the outside. The print data from the externally connected device 200 is transmitted to the control unit 150 via the I/O port 154 and is stored in the image memory 155.

Hereinafter, the ejection waveform and the cancellation waveform of the driving signal are described as the characteristics of the liquid ejection head 1 used in the liquid ejection device 100 according to an embodiment and the drive waveform of the liquid ejection head 1.

Figure 6:
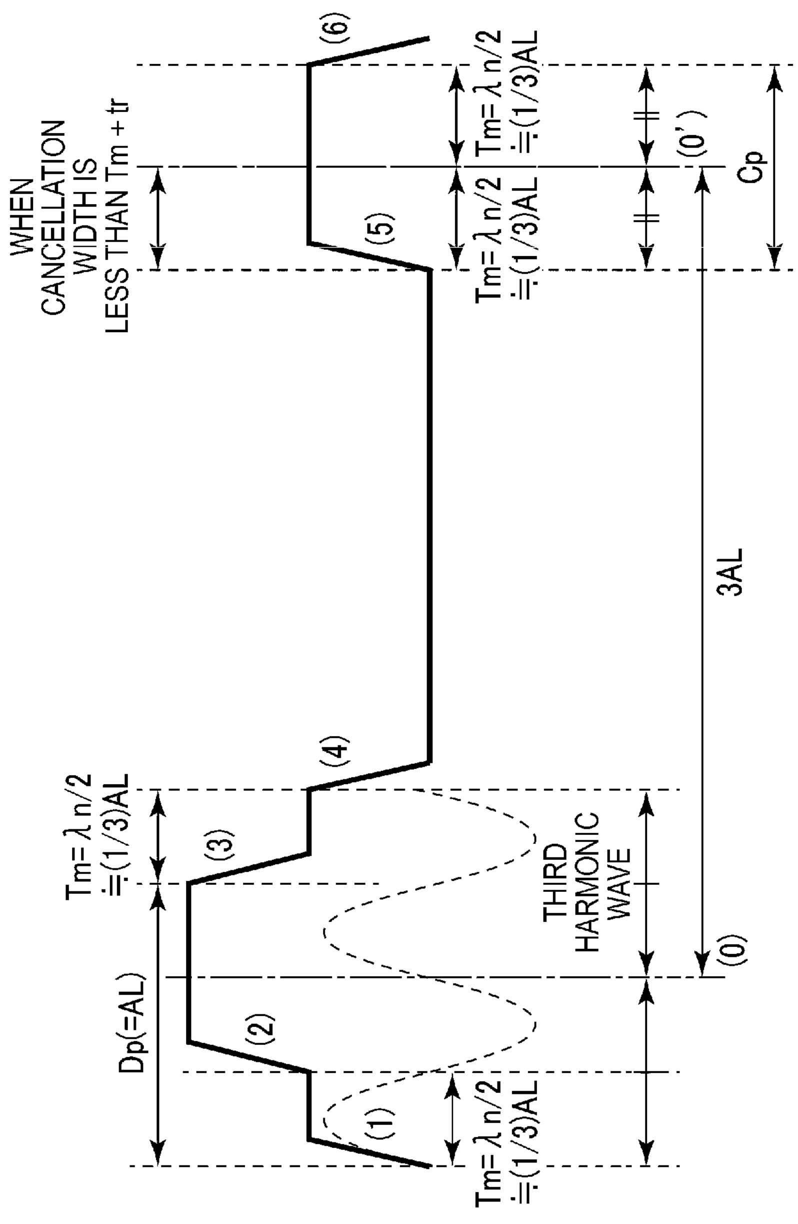
FIG. 6 is an explanatory diagram illustrating an example of a drive waveform including a cancellation waveform and an ejection waveform supplied to the liquid ejection head.
Figure 7:
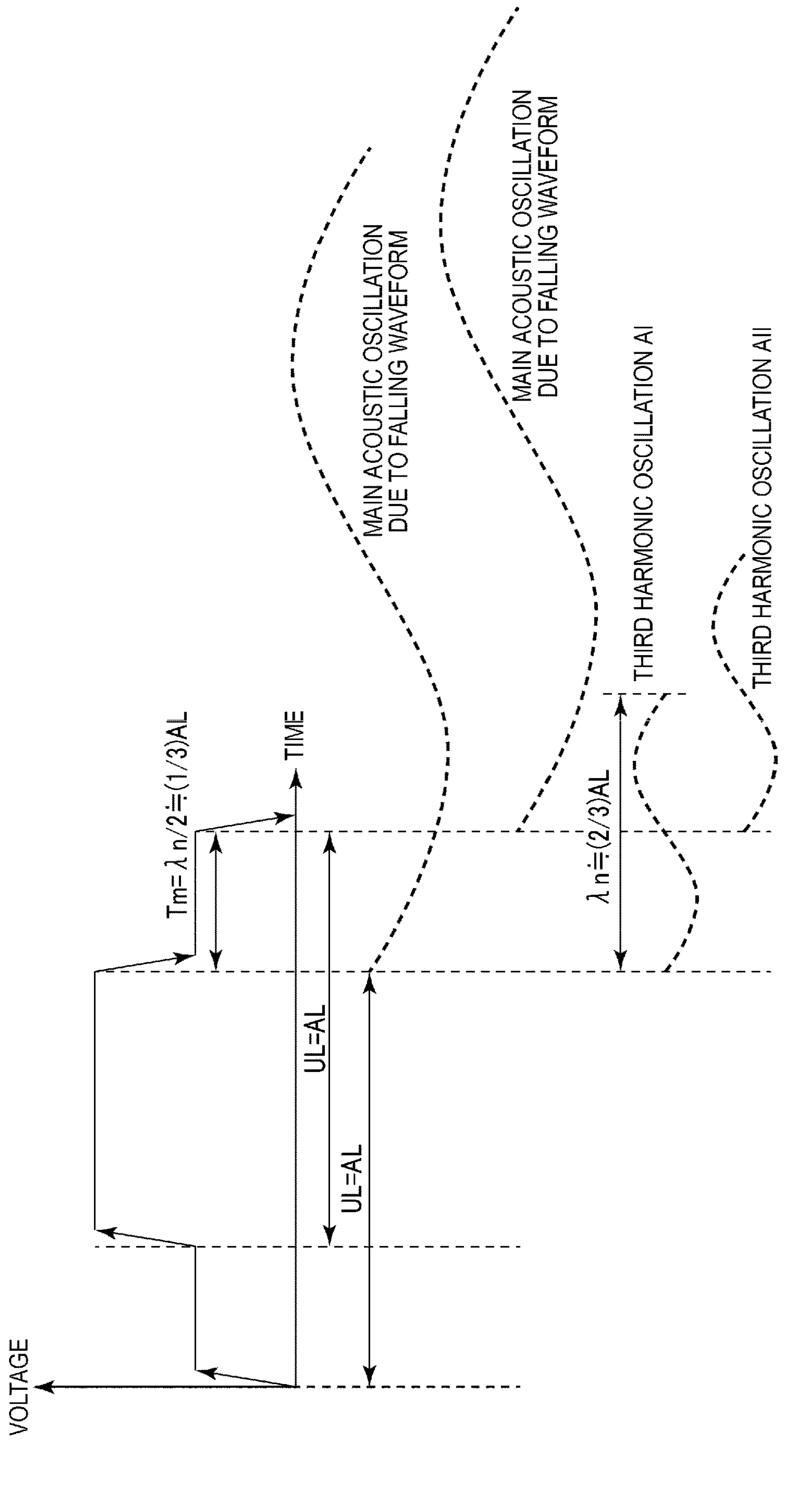
FIG. 7 is an explanatory diagram illustrating an example of the drive waveform and an acoustic oscillation of the liquid ejection head.
Figure 9A:
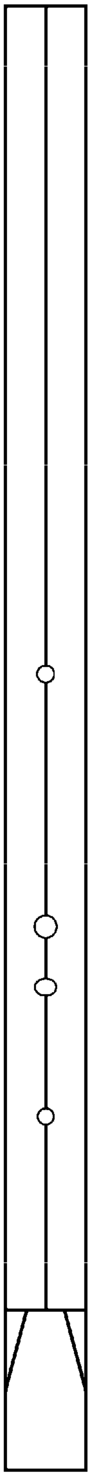
FIGS. 9A to 9C are explanatory diagrams each illustrating an example of liquid droplets ejected by the liquid ejection head.
Figure 9B:
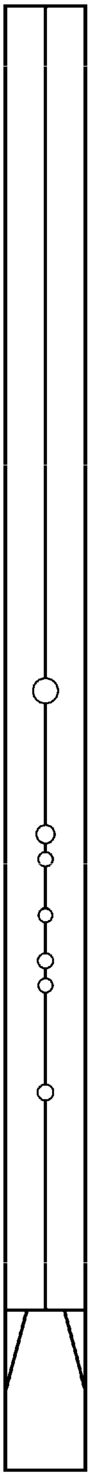
Figure 9C:
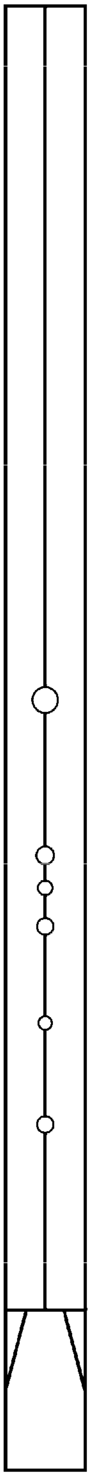
Figure 10:
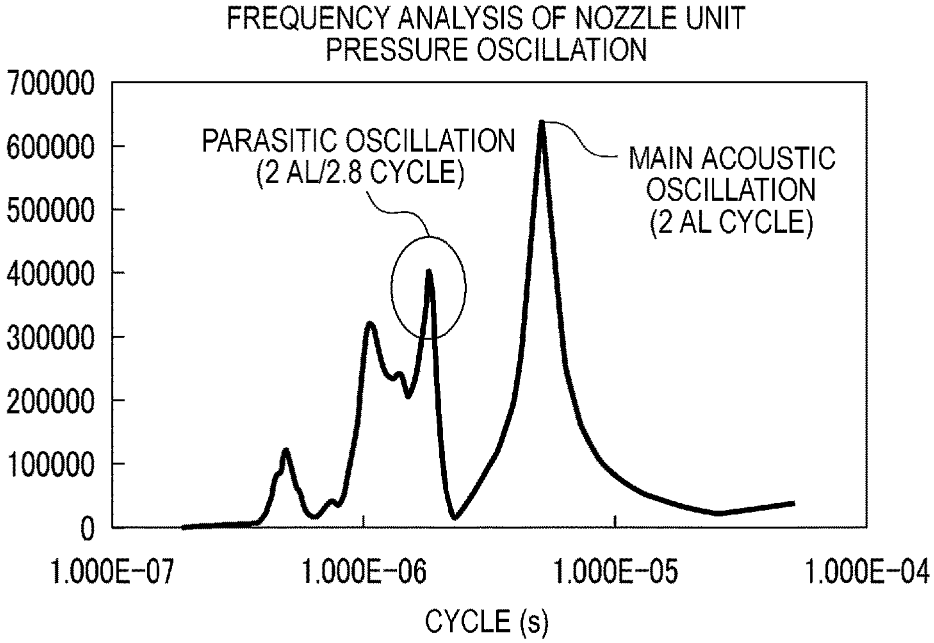
FIG. 10 is an explanatory diagram illustrating an example of frequency analysis of pressure oscillation of a liquid ejection head according to a comparative example.
Figure 11:
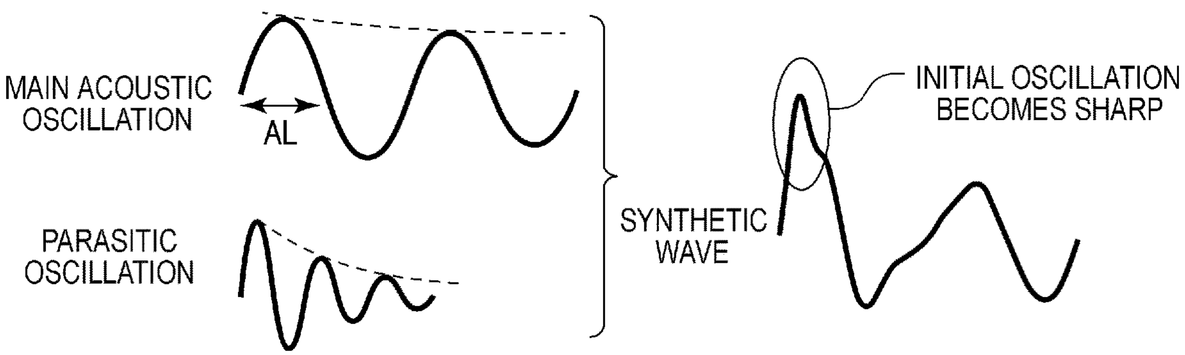
FIG. 11 is an explanatory diagram illustrating an example of synthesizing main acoustic oscillation and parasitic oscillation of the liquid ejection head according to the comparative example.
Figure 12:
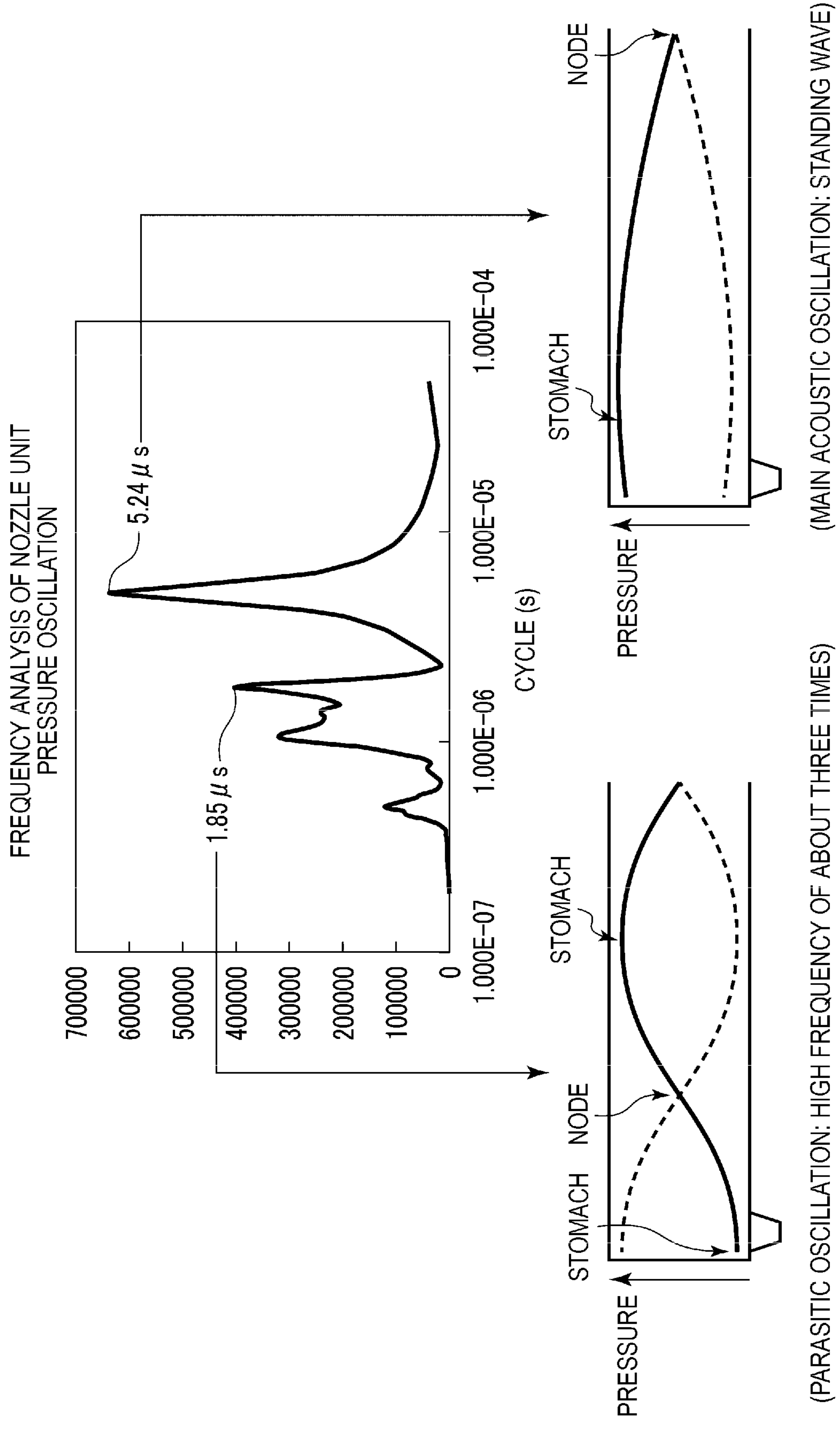
FIG. 12 is an explanatory diagram illustrating an example of frequency analysis of oscillation of the liquid ejection head according to the comparative example.
Figure 13:
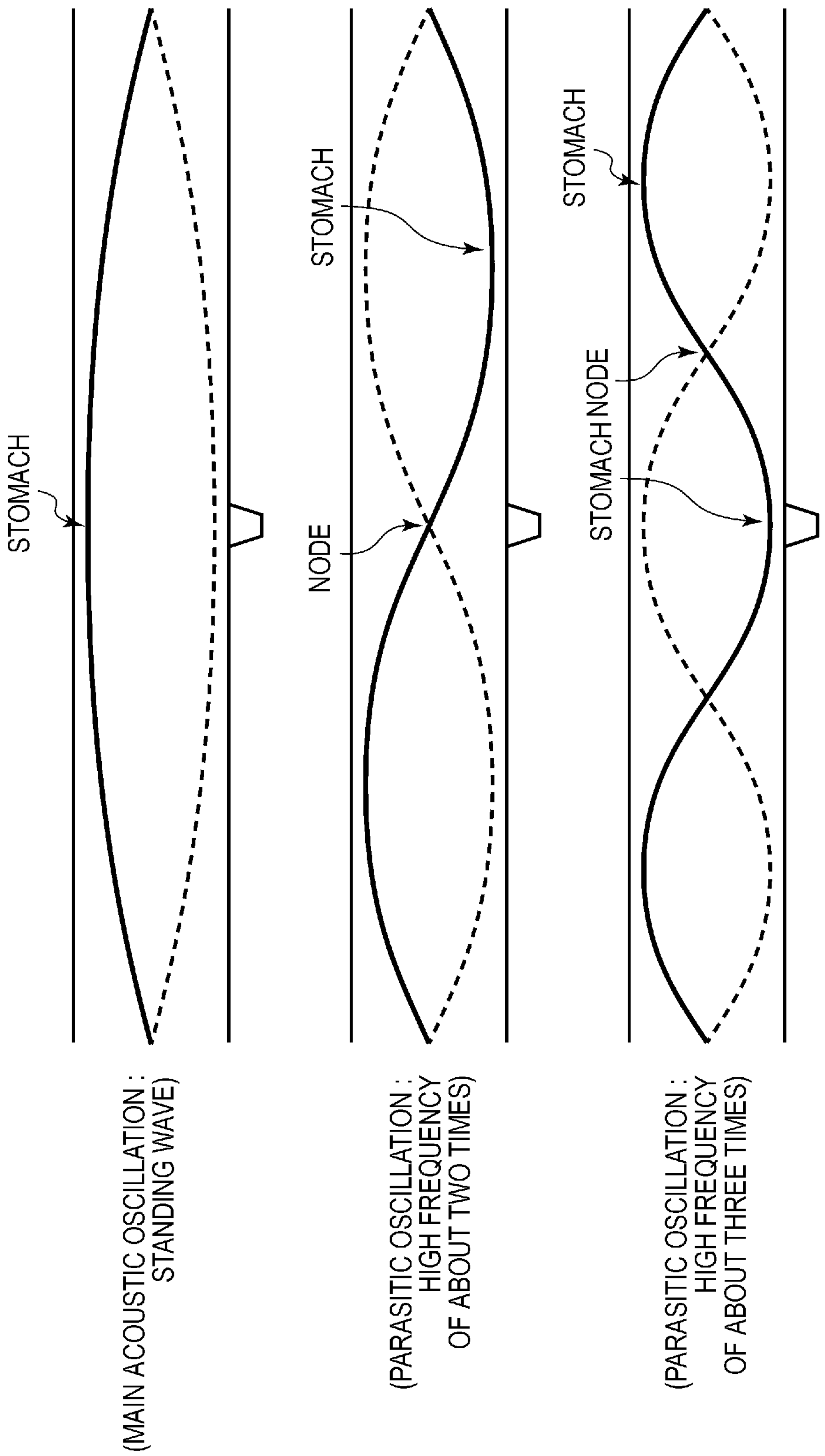
FIG. 13 is an explanatory diagram illustrating an example of the drive waveform and the acoustic oscillation of the liquid ejection head according to the comparative example.
Figure 14:
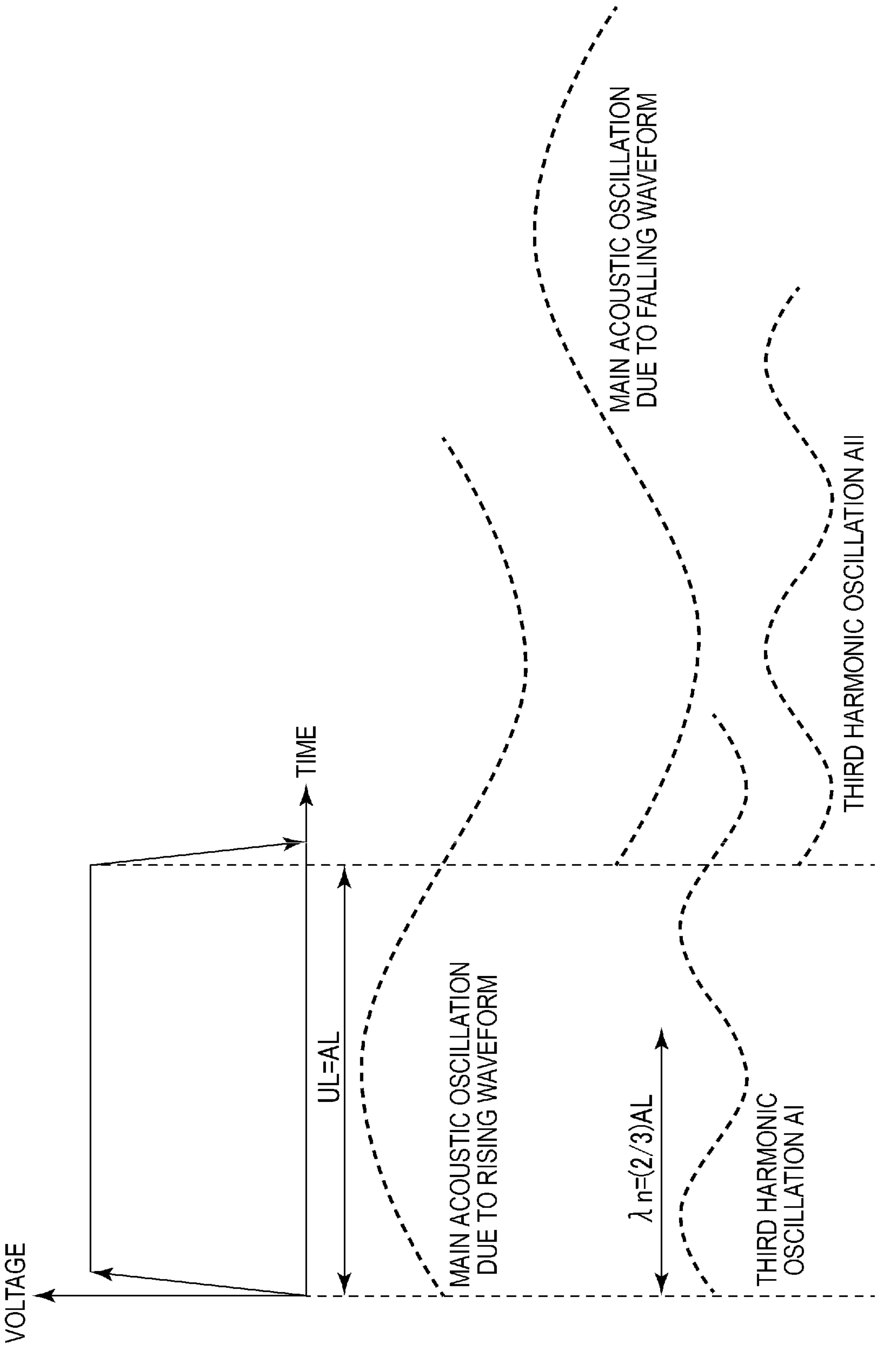
FIG. 14 is an explanatory diagram illustrating an example of the drive waveform and the acoustic oscillation in the liquid ejection head according to the comparative example.

First, the drive waveform of the liquid ejection head 1 according to an embodiment is described with reference to FIGS. 6 to 14. Note that FIG. 6 is an explanatory diagram illustrating an example of the drive waveform including an ejection waveform and a cancellation waveform supplied to the liquid ejection head 1. FIG. 7 is an explanatory diagram illustrating an example of the drive waveform and the acoustic oscillation in the liquid ejection head 1, FIG. 8 is an explanatory diagram illustrating the relationship between the drive waveform and the ejected liquid droplet in an example of the liquid ejection head 1, and FIGS. 9A to 9C are an explanatory diagram illustrating an example of the ejected liquid droplets ejected by the liquid ejection head 1. FIGS. 10 to 14 are drawings for illustrating a liquid ejection head in the related art as a comparative example, FIG. 10 is an explanatory diagram illustrating an example of frequency analysis of pressure oscillation of the liquid ejection head according to the comparative example, FIG. 11 is an explanatory diagram illustrating an example of synthesizing main acoustic oscillation and parasitic oscillation of FIG. 10, FIG. 12 is an explanatory diagram illustrating an example of the frequency analysis of the oscillation of the liquid ejection head according to the comparative example, FIG. 13 is an explanatory diagram illustrating an example of the drive waveform and the acoustic oscillation in the liquid ejection head according to the comparative example, and FIG. 14 is an explanatory diagram illustrating an example of the drive waveform and the acoustic oscillation in the liquid ejection head according to the comparative example.

First, the liquid ejection head in the related art has a driving method, so-called pulling, of increasing the ejection force by driving the piezoelectric columns in accordance with a half cycle AL of the main acoustic oscillation of the pressure chamber. However, as illustrated in the example of the frequency analysis of the nozzle unit pressure oscillation of FIG. 10, if the liquid ejection head (i.e., the actuator) is driven to eject the liquid droplet from the nozzle, parasitic oscillation may occur in a frequency region higher than the main acoustic oscillation in the pressure chamber in addition to the main acoustic oscillation by ink fluidic oscillation.

When a droplet is ejected from a nozzle by driving an actuator, if parasitic oscillation with a frequency higher than that of the main acoustic oscillation occurs, the pressure in the pressure chamber has a shorter cycle pressure peak than the half cycle of the main acoustic oscillation, as illustrated in FIG. 11. That is, the synthesized wave obtained by synthesizing the main acoustic oscillation and the parasitic oscillation has a sharp initial oscillation. A pressure peak having a short cycle increases the ejection speed of the leading end portion of the ejected liquid droplet but does not last until the end of the ejection and lowers the ejection speed of the trailing end portion of the ejected liquid droplet. Then, as illustrated in FIG. 9A, if the droplet is ejected, the volume of the satellite with respect to the leading end liquid droplet increases, to deteriorate print quality. Here, a satellite (satellite droplet) is a liquid droplet that is ejected closely following the first ejected droplet (i.e., the leading end liquid droplet) but with a small gap from the leading end liquid droplet ejected from a nozzle by driving the piezoelectric column 21 and deforming the pressure chamber.

Furthermore, in the liquid ejection head in the related art, as illustrated in the frequency analysis of FIG. 12, in addition to the main acoustic oscillation, parasitic oscillation of about 3 times (for example, 2.8 times) occurs. In this context, the following is considered as the causes of the parasitic oscillation having a frequency higher than that of the main acoustic oscillation in the pressure chamber of the liquid ejection head.

One of the causes can be oscillation of an odd multiple of three or more in the liquid column oscillation in a closed tube, and an example of a liquid ejection head having such a closed tube is an end shooter type having a connection point to a common channel as an open end, similarly to the liquid ejection head 1 as illustrated in FIG. 12.

Another one of the causes can be oscillation of an integer multiple of two or more in the liquid column oscillation in an open tube, and an example of a liquid ejection head having such an open tube is a side shooter type having a connection point to a common channel as an open end, as illustrated in FIG. 13. Note that in the main acoustic oscillation of the open tube, the amplitude of the pressure oscillation becomes the greatest in the central portion of the open tube, and thus a nozzle is provided near the central portion of the open tube. As illustrated in FIG. 13, if oscillation of an even multiple of two or more occurs in the liquid column oscillation of the open tube, the central portion of the open tube becomes a node of the oscillation having the small pressure oscillation amplitude. Therefore, if the nozzle is provided near the central portion of the open tube, the shape of the ejected liquid droplet is not likely to receive the influence of the oscillation of an even multiple of two or more. Therefore, if the nozzle is provided near the central portion of the open tube, the oscillation of an odd multiple of three or more increases the volume of the satellite more than the oscillation of an even multiple of two or more, and thus the print quality is deteriorated more easily.

Still another one of the causes can be oscillation caused by reflection of the pressure oscillation due to the change in the sound velocity of each channel if the pressure chamber and the individual channel have different channel cross-sectional surfaces.

Yet another one of the causes can be oscillation caused because the pressure generated in the pressure chamber is reduced in the channel having a low rigidity if the rigidity of the wall surface or a part of the wall surface of the individual channel is less than the pressure chamber, and a node of the pressure oscillation is generated between the pressure chamber and the channel having a low rigidity. This is a case where, for example, an installation range of an actuator of PZT or the like (e.g., the piezoelectric columns 21) illustrated with a two-dot chain line in FIG. 1 is biased as the actuator indicated by the solid line in FIG. 1 with respect to the range of the diaphragm on the wall surface of the pressure chamber due to manufacturing errors, and the area of a range, which is supported only by the diaphragm and is not supported by the actuator, on the wall surface of the pressure chamber is relatively large. Note that, results of the frequency analysis of the pressure oscillation of the nozzle unit if simulation of structural analysis of deformation of PZT or a pressure chamber, compressible fluid analysis of a liquid behavior in the channel, and fluid surface analysis of liquid droplet ejection from the nozzles is performed with respect to the head in a case where the range, which is supported only by the diaphragm and is not supported by the actuator, on the upper right of the pressure chamber of FIG. 1 is a range of about less than 30% of the length of the pressure chamber in the longitudinal direction (the horizontal width of the pressure chamber 46 in FIG. 1) are the graphs illustrated in FIGS. 10 and 12.

Also, as illustrated in FIG. 14, if a rectangular wave width UL of the ejection waveform is AL, third harmonic oscillation AI generated by the pressure chamber expansion (rising waveform) in advance before ejection and third harmonic oscillation AII of the liquid column oscillation by the pressure chamber contraction (falling waveform) during ejection strengthen each other, and thus pressure peaks with a short cycle are generated due to the third harmonic oscillation, thereby causing the deterioration of print quality.

Next, an example of the driving and the drive waveform of the liquid ejection head 1 is described. In an embodiment, the pressure oscillation of the pressure chamber 46 of the liquid ejection head 1 is diagnosed as the liquid column oscillation of the closed tube, an acoustic resonance frequency of parasitic oscillation in a frequency region higher than the main acoustic resonance frequency of main acoustic oscillation of the liquid in the pressure chamber 46 is a drive waveform that suppresses third harmonic oscillation of about an odd multiple of about three or more of the main acoustic resonance frequency. Here, about three times include 2.8 times as illustrated in FIG. 10.

First, if the potential difference is the greatest, in the liquid ejection head 1, the pressure chamber 46 is expanded the greatest by the piezoelectric column 21 of the actuator 20. If the potential difference is the smallest, the pressure chamber of the ink is contracted the smallest by the piezoelectric columns 21 of the actuator 20. Also, if the ink is ejected by the liquid ejection head 1, the pressure chamber 46 before ejection is expanded in advance, and the ink is ejected by contracting the pressure chamber 46 at the time of ejection. In the example of the present embodiment, the ejection waveform of the drive waveform of the liquid ejection head 1 is increased two times consecutively by using the potential difference (hereinafter referred to as the expansion potential difference) including the intermediate potential difference a plurality of times, when the pressure chamber 46 is expanded in advance before ejection, or is reduced two times consecutively by using the potential difference including the intermediate potential difference (hereinafter referred to as the contraction potential difference) a plurality of times, when the pressure chamber 46 is contracted during ejection. The ejection waveform may change the potential difference two times consecutively during both expansion and contraction of the pressure chamber 46.

Also, after the ejection waveform for ejecting the ink by the liquid ejection head 1 is input, the cancellation waveform is input to cancel the residual oscillation generated after the ejection of the ink. Since the residual oscillation in the pressure chamber 46 is attenuated by channel resistance and the like, in the example of the present embodiment, differently from the ejection waveform, the cancellation waveform of the drive waveform of the liquid ejection head 1 is a trapezoidal single-step rectangular waveform (hereinafter referred to as a trapezoidal waveform) with a waveform width Cp of the cancellation waveform less than AL. Note that if the viscosity of the ink is high, the attenuation of the residual oscillation is large, and the width of the cancellation waveform is correspondingly reduced.

FIGS. 6 and 7 illustrate drive waveforms if ink of the liquid ejection head 1 is ejected. In FIGS. 6 and 7, the vertical axis is voltage (potential difference), and the horizontal axis is time. Note that the drive waveform is generated by the driver IC 72 of the drive circuit 70. As illustrated in FIG. 6, in the ejection waveform, the drive waveform increases the expansion potential difference in two steps at the time of expanding the pressure chamber 46 and reduces the contraction potential difference in two steps at the time of contracting the pressure chamber 46 during ejection. In addition, in the ejection waveform, at the time of expanding and contracting the pressure chambers 46, the drive waveform applies the potential difference at the first time at the time of changing the potential difference, then maintains the potential difference at the first time for a predetermined period of time, and thereafter applies the potential difference at the second time. Also, in the cancellation waveform, the drive waveform increases the expansion potential difference at the time of expanding the pressure chamber 46 in one step, then reduces the contraction potential difference at the time of contracting the pressure chamber 46 in one step, further increases the expansion potential difference in one step at the time of expanding the pressure chamber 46, and then reduces the contraction potential difference in one step at the time of contracting the pressure chamber 46. Further, if the pressure chamber is expanded if the voltage (potential difference) is reduced, the voltage is increased in order to contract the pressure chamber in advance before the ejection waveform is input. Next, the pressure chamber is expanded in two steps by reducing the voltage in two steps by inputting the ejection waveform, and then the pressure chamber is contracted by increasing the voltage in two steps at the time of contracting the pressure chamber 46 during ejection. In addition, in the cancellation waveform, the drive waveform expands the pressure chamber by reducing the voltage in one step, then contracting the pressure chamber by increasing the voltage.

First, an example of the ejection waveform is specifically described with reference to FIG. 7. As illustrated in FIG. 7, if the pressure chamber 46 is expanded in advance before ejection of the ink, the expansion potential difference is increased two times consecutively from the time of the expansion start by the expansion potential difference at the first time in a case where the potential difference is increased two times consecutively, and then the time interval until the time of the contraction start by the contraction potential difference at the first time is set as UL. In addition, as illustrated in FIG. 7, if the pressure chamber 46 during ejection is contracted, the time interval from the time of the expansion start by the expansion potential difference at the second time in a case where the potential difference is increased two times consecutively before reducing until the time of the contraction start by the contraction potential difference at the second time in a case where the contraction potential difference is reduced two times consecutively, after the expansion potential difference is increased two times consecutively is set as UL. Note that in FIG. 6 and the following description, the time interval UL from the time of the expansion start by the expansion potential difference at the first time in a case where the potential difference is increased two times consecutively until the time of the contraction start by the contraction potential difference at the first time after the expansion potential difference is increased two times consecutively may be described as Dp.

That is, as illustrated in FIG. 7, the drive waveform that ejects the ink from the nozzle 51 deforms the pressure chamber 46 and changes the potential difference two times consecutively during both expansion and contraction of the pressure chamber 46. Also, in the drive waveform, the time interval from the time point when the potential difference increases at the first time during the expansion of the pressure chamber 46 until the time point when the potential difference is reduced at the first time during the contraction of the pressure chamber 46, and the time interval from the time of the expansion start at the second time when the potential difference is increased two times consecutively during the expansion of the pressure chamber 46 to the time of the contraction start at the second time when the potential difference is reduced two times consecutively during the contraction of the pressure chamber 46, are set as UL. Also, the time interval UL is greater than 0.5 AL and less than 1.5 AL. In one embodiment, UL=AL. This is because, if UL is set to be greater than 0.5 AL and less than 1.5 AL, the main acoustic oscillation generated by the expansion of the pressure chamber 46 in advance before ejection and the main acoustic oscillation generated by the contraction of the pressure chamber 46 during ejection strengthen each other.

Here, if the cycle of the parasitic oscillation such as the third harmonic wave is set as λn, and the time interval between the potential difference change start time at the first time and the potential difference change start time at the second time in a case where the potential difference is increased two times consecutively or the potential difference is reduced two times consecutively is set as Tm, the drive waveform satisfies Tm=λn/2. If the piezoelectric column 21 (the actuator) is driven by such a drive waveform, as illustrated in FIG. 7, the phase difference between the parasitic oscillation generated if the potential difference is changed at the first time and the parasitic oscillation generated if the potential difference is changed at the second time is 180 degrees, and the parasitic oscillation cancels each other out. Therefore, the deterioration of the print quality can be suppressed by the parasitic oscillation such as the third harmonic wave.

As illustrated in FIG. 7, the drive waveform causes the potential difference change amount of the potential difference change at the first time and the potential difference change amount of the potential difference change at the second time to be the same, the parasitic oscillation of which the amplitudes are almost the same in the pressure chamber 46, and the phase difference is different from each other by 180 degrees cancels each other out. Therefore, the residual oscillation derived from the parasitic oscillation thereafter can be greatly suppressed.

In this manner, if the time interval UL of the ejection waveform or drive waveform if the potential difference is increased two times consecutively, or if the potential difference is reduced two times consecutively is set as AL, and a time interval Tm is set as λn/2, as illustrated in FIG. 7, the phase difference between the parasitic oscillation generated by the pressure chamber contraction (falling waveform) if the potential difference at the first time is changed (the third harmonic oscillation AI) and the parasitic oscillation generated by the pressure chamber contraction if the potential difference at the second time is changed (the third harmonic oscillation AII) is 180 degrees, and the parasitic oscillation cancels each other out. Further, by causing the time interval Tm if the pressure chamber is expanded two times consecutively by increasing the potential difference two times consecutively to be λn/2, similarly, the phase difference between the parasitic oscillation generated by the pressure chamber expansion (rising waveform) if the potential difference at the first time is changed and the parasitic oscillation generated by the pressure chamber expansion if the potential difference at the second time is changed becomes 180 degrees, and the parasitic oscillation cancels each other out. In addition, by causing UL to be AL, the main acoustic oscillation generated by the pressure chamber expansion in advance before ejection and the main acoustic oscillation generated by the pressure chamber contraction during ejection strengthen each other, to increase the ejection force by the main acoustic oscillation. Further, if the pressure chamber is expanded in a case where the voltage (potential difference) is reduced, the voltage is increased by contracting the pressure chamber in advance before the ejection waveform is input. Next, the pressure chamber is expanded in two steps by reducing the voltage in two steps by the input of the ejection waveform, and also the pressure chamber is contracted by increasing the voltage in two steps at the time of contracting the pressure chamber 46 during ejection.

Here, in the drive waveform, the condition of Tm in which the parasitic oscillation of the cycle λn weakens each other is described. First, the oscillation of the cycle λn generated when the potential difference at the first time is changed is set as A, and an oscillation vector of A after the period of time Tm is set as A'. An oscillation vector of the cycle λn generated when the potential difference at the second time is changed after Tm is set as B. The absolute value of the composite vector of A' and B becomes a minimum when Tm is an odd multiple of λn/2, i.e., the phase difference between A' and B is 180 degrees. If a condition in which the absolute value of the composite vector of A' and B from an expression for synthesizing the simple harmonic motion of the cycle λn is equal to or less than the larger of the absolute values of A' and B (if the absolute value of A' and the absolute value of B are the same value, equal to or less than the value) is obtained, the phase difference between the oscillation vectors A' and B becomes within 180 degrees±60 degrees.

The absolute value of the composite vector of A' and B can be deformed by the following expression. Here, if OA is a phase of A', and OB is a phase of B, the absolute value of the composite vector of A' and B is:

$$\sqrt{(|A'|^2+|B|^2+2*|A'|*|B|*\cos(\theta A-\theta B))}.\quad\text{(Numerical Expression 1)}$$

Here, if |A'|≤|B|, the phase difference between A' and B (θA−θB) in which |B|≥Numerical Expression 1 is satisfied becomes the condition in which the oscillation of the cycle an weakens each other. If |B|≥Numerical Expression 1 is deformed by squaring both sides, $$0\geq|A'|+2*|B|*\cos(\theta A-\theta B)\quad\text{(Numerical Expression 2)}$$

is satisfied. From the above, if the phase difference between A' and B (θA−θB) is within the range of 180 degrees±60 degrees, Numerical Expression 2 is satisfied.

Also, if |B|≤|A'|, if |A'|≥Numerical Expression 1 is deformed by squaring both sides, $$0\geq|B|+2*|A'|*\cos(\theta A-\theta B)\quad\text{(Numerical Expression 3)}$$

is satisfied. With the above, if the phase difference between A' and B (θA−θB) is within the range of 180 degrees±60 degrees, Numerical Expression 3 is satisfied.

From these, the condition in which the parasitic oscillation of the cycle an weakens each other is:

$$(k/2-1/6)\ \lambda n\leq Tm\leq(k/2+1/6)\ \lambda n.\quad\text{(Numerical Expression 4)}$$

Here, k is an odd number of 1 or more.

If the potential difference is changed two times consecutively during both the expansion and contraction of the pressure chamber 46, Tm of the drive waveform is (k/2−⅙) λn≤Tm≤(k/2+⅙) λn (k is an odd number of 1 or more) on both of the intermediate potential difference holding time during the pressure chamber expansion and the intermediate potential difference holding time during the pressure chamber contraction.

In addition, in view of reduction of power consumption by causing main acoustic oscillation generated at the time of change of the corresponding intermediate potential difference from the potential difference one before and at the time of change thereof to the next potential difference to strengthen each other, shorter Tm is better.

In this point of view, if the reduction of power consumption is considered, Tm of the drive waveform is:

$$(k/2-1/6)\ \lambda n\leq Tm\leq k\lambda n/2.\quad\text{(Numerical Expression 5)}$$

Here, k is an odd number of 1 or more.

Next, as an evaluation of the drive waveform of the liquid ejection head 1, FIG. 8 illustrates results in a case where the liquid ejection head 1 of 2 AL=5.24 s is driven in various waveforms, and ink is ejected by one drop. Note that the voltage is adjusted so that the leading drop speed becomes about 8 m/s in all results of various waveforms in FIG. 8.

The first drive waveform in FIG. 8 is, as a comparative example, set to a drive waveform having the trapezoidal shape illustrated in FIG. 14 of which the rise time tr is 0.2 μs, the others are set to drive waveforms that change the potential difference two times as illustrated in FIG. 7, Tm is set to be different, and all rise time is set to 0.2 μs. Also, the ejection voltage indicates the difference between the expansion potential difference and the contraction potential difference. Note that the intermediate potential difference is the intermediate value of the expansion potential difference and the contraction potential difference.

In the liquid ejection head 1 and the liquid ejection head of the comparative example, as indicated by the frequency analysis of FIG. 12, parasitic oscillation of about three times occurs in addition to the main acoustic oscillation. The cycle λn of the parasitic oscillation is 1.85 μs, and μλn/2 becomes 0.925 μs.

In addition, as illustrated in FIGS. 9A to 9C, if one drop of ink is applied, the result obtained by simulating the state of the ejected liquid droplet is indicated. FIG. 9A illustrates an example of ejected liquid droplets using a drive waveform in a trapezoidal shape according to the comparative example in which tr=0.2 μs, FIG. 9B illustrates an example of ejected liquid droplets using the drive waveform according to the above-described embodiment in which the potential difference is changed two times and Tm=0.62 μs, and FIG. 9C illustrates an example of ejected liquid droplets using the drive waveform according to the above-described embodiment in which the potential difference is changed two times and Tm=0.93 μs.

As illustrated in FIG. 8 and FIG. 9C, in the waveform in which Tm=0.93 μs that is the closest to the half cycle of the parasitic oscillation has the largest ratio of the leading drop volume with respect to the total ejection volume, and it can be understood that the ratio of the leading drop volume becomes smaller, as Tm is separated from 0.925 μs as illustrated in FIG. 8 and FIG. 9B. Also, it can be understood that, as Tm becomes smaller, the ejection voltage per unit volume (ejection voltage/total ejection volume) tends to be lower. From these results, the drive waveform of the liquid ejection head 1 can suppress the oscillation having the frequency higher than the main acoustic oscillation, while suppressing the power consumption.

Next, the example of the cancellation waveform is specifically described with reference to FIG. 6. Note that for convenience of explanation, in FIG. 6, the first to fourth potential difference changes in the ejection waveform are labelled as (1) to (4), and the first and second potential difference changes in the cancellation waveform are labelled as (5) to (6). Also, the reference point of the phase of the ejection waveform is labelled as (0), and the reference point of the phase of the cancellation waveform is labelled as (0'). Note that, here, the reference point (0) of the phase of the ejection waveform is intermediate between (2) and (3) of the potential difference changes, and the reference point (0') of the phase of the cancellation waveform is intermediate between (5) and (6) of the potential difference changes. Also, in the example of FIG. 6, voltage falling time tf is substantially the same as the voltage rising time tr. In addition, for convenience of explanation, all the potential differences of the potential difference changes from (1) to (4) are assumed to be equivalent, and attenuation of the oscillation due to fluid resistance is assumed to be small and is ignored in the following description.

First, the main acoustic oscillation of the ejection waveform is illustrated. In the ejection waveform, if the potential difference is changed, and the intermediate voltage for expanding the pressure chamber 46 as illustrated in (1) is input, the pressure chamber 46 is expanded due to the potential difference of (1), and the pressure in the pressure chamber 46 is reduced. The oscillation caused by this becomes oscillation of which the phase is advanced by $-\pi+(Dp+Tm)/2$. Further, if the potential difference is changed as illustrated in (2), the oscillation becomes oscillation of which the phase is advanced by $-\pi+(Dp-Tm)/2$ in (2). The synthesized wave of (1) and (2) becomes the oscillation of which the phase is advanced by $-\pi+Dp/2$.

Potential differences in (3) and (4) as the potential difference changes for contracting the pressure chamber 46 are changed in an opposite way to (1) and (2) as the potential difference changes for expansion, the pressure chamber 46 is contracted, and the inside of the pressure chamber 46 is pressurized. Therefore, (3) becomes oscillation of which the phase is advanced by $-(Dp-Tm)/2$. Also, (4) can be considered as oscillation of which the phase is advanced by $-(Dp+Tm)/2$. Therefore, the synthesized wave of (3) and (4) becomes oscillation of which the phase is advanced by $-Dp/2$.

Here, if the synthesized wave of (1), (2), (3), and (4) at the time point of (0) are assumed, the synthesized wave of (1), (2), (3), and (4) becomes oscillation of which the phase is advanced by $-\pi/2$.

Next, the main acoustic oscillation of the cancellation waveform is illustrated. In the cancellation waveform, if the first potential difference change is performed for expanding the pressure chamber 46, and the potential difference illustrated in (5) is input, the pressure chamber 46 is expanded, and the pressure in the pressure chamber 46 is reduced. Therefore, the oscillation occurring by the input of the potential difference illustrated in (5) becomes oscillation of which the phase is advanced by $-\pi+Cp/2$.

The potential difference in (6) as the second potential difference change for contracting the pressure chamber 46 is changed in an opposite way to (5) as the potential difference change for expansion. Therefore, if the potential difference shown in (6) is input, the pressure chamber 46 is contracted, and the inside of the pressure chamber 46 is pressurized. Therefore, the oscillation occurring by the input of the potential difference shown in (6) becomes oscillation of which the phase is advanced by $-Cp/2$.

If a synthesized wave of (5) and (6) at time point (0') is assumed, the synthesized wave of (5) and (6) is oscillation of which the phase is advanced by $-\pi/2$.

Therefore, if the time difference between (0) and (0') is an odd multiple of $\pi/2$ (AL), the synthesized wave of (1), (2), (3), and (4) and the synthesized wave of (5) and (6) have opposite phases and weakens each other. Also, if the time width (i.e., the waveform width of the cancellation waveform) Cp of (5) and (6) is AL, the amplitude of the synthesized wave of (5) and (6) is maximized. By causing the time widths of (5) and (6) to be less than or greater than AL, the amplitude of the synthesized wave (cancellation waveform) of (5) and (6) can be adjusted. Therefore, by the setting of the time width Cp of (5) and (6), the residual oscillation due to the synthesized waves of (1), (2), (3) and (4) can be cancelled out by the synthesized waves of (5) and (6).

The residual oscillation of the synthesized wave of (1), (2), (3), and (4) can be cancelled out by causing the time difference between (0) and (0') from the above to be 1 AL. However, if the time difference between (0) and (0') is 1 AL, the residual oscillation is cancelled out during the liquid droplet ejection, and thus the ejection force of the liquid droplet is weakened. Therefore, it is preferable that the time difference between (0) and (0') is set to 3 AL or more of the odd multiple of AL.

As described above, by setting a trapezoidal or single-step rectangular cancellation waveform for the stair-like ejection waveform having a plurality of steps, it is possible to prevent the liquid droplet obtained by the next ejection waveform after the cancellation waveform from receiving the influence of the residual oscillation caused by the main acoustic oscillation generated by the previous ejection waveform.

Figure 15:
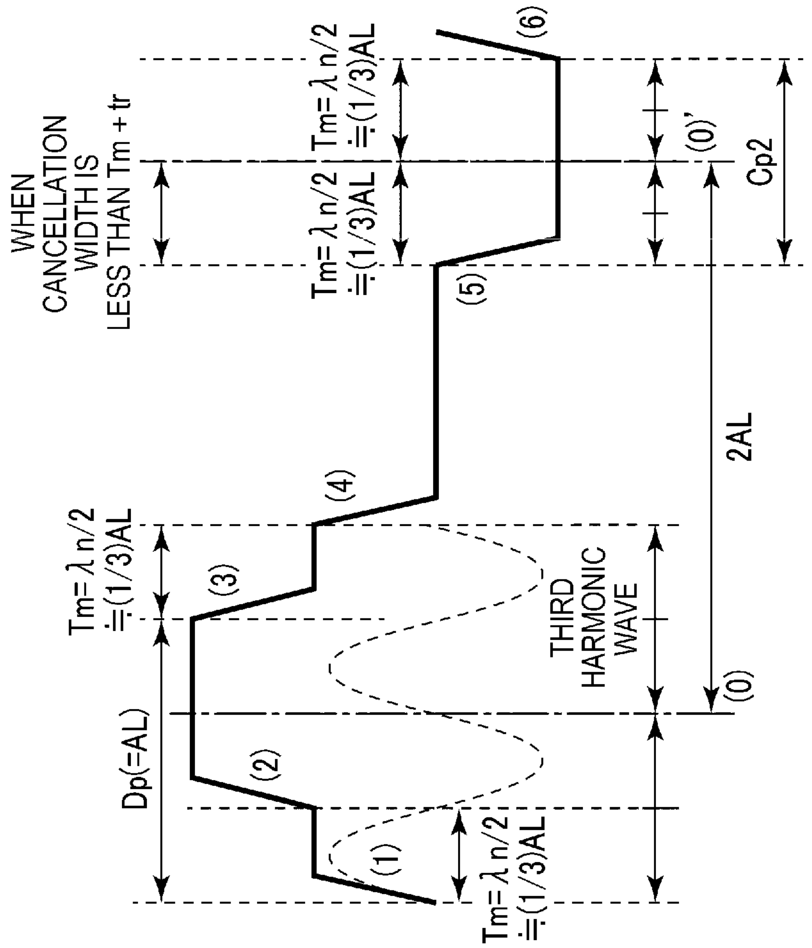
FIG. 15 is an explanatory diagram of an example of a drive waveform and a cancellation waveform according to another embodiment.

Note that the potential difference of the cancellation waveform may be changed to have the polarity different from the ejection waveform with respect to the ground voltage of the ejection waveform, for example, the negative polarity. For example, FIG. 15 illustrates an example of the cancellation waveform of the potential difference change to a negative polarity according to another embodiment. The example illustrated in FIG. 15 is a cancellation waveform in which the pressure chamber is contracted by potential difference change to a negative polarity in (5), and the pressure chamber returns by the potential difference change of (6). In such a cancellation waveform, the potential from (5) to (6) become the lowest potential in the drive waveforms, and thus the potentials are set as the ground voltage, and the other potential has the potential higher than the ground voltage. Also, in the example of FIG. 15, in the ejection waveform and the cancellation waveform, there are three potential differences having the potential higher than the ground voltage. Therefore, if such a cancellation waveform is used, for example, the drive circuit 70 is connected to the fourth voltage source, in addition to the first voltage source 81 to the third voltage source 83, and may be configured to connect any one of the first voltage source 81, the second voltage source 82, the third voltage source 83, and the fourth voltage source to the wiring electrode 727 by the control of the voltage control unit 724.

Further, in case the pressure chamber is expanded as a voltage or potential difference is reduced, the voltage is increased in order to contract the pressure chamber in advance before the ejection waveform input. Next, the pressure chamber is expanded in two steps by reducing the voltage in two steps by the ejection waveform input, and the pressure chamber is contracted by increasing the voltage in two steps at the time of contracting the pressure chamber 46 during ejection. In addition, in the cancellation waveform, the drive waveform contracts the pressure chamber by increasing the voltage in one step, then expands the pressure chamber by reducing the voltage in one step. In this case, since the potential after the voltage is reduced in two steps for pressure chamber expansion in the ejection waveform and immediately before the pressure chamber contraction starts becomes the lowest potential in the drive waveform, the potential is set as the ground voltage, and the other potentials have potentials higher than the ground voltage.

Also in the cancellation waveform of the example of FIG. 15, main acoustic oscillation is described below by using the reference point of the phase between (5) and (6) of the cancellation waveform as (0'). Assuming the synthesized wave of (5) and (6) at the time point of (0'), the polarity becomes opposite to that of the cancellation waveform of the example of FIG. 6, and the pressure chamber 46 is contracted and the inside of the pressure chamber 46 is pressurized due to the potential difference of (5). Therefore, the oscillation occurring due to the input of the potential difference indicated by (5) becomes oscillation of which the phase is advanced by Cp/2. Since the pressure chamber 46 returns to the original and the pressure in the pressure chamber 46 is reduced by the potential difference of (6), the oscillation occurring due to the input of the potential difference indicated by (6) becomes oscillation of which the phase is advanced by π−Cp/2. Here, if the synthesized wave of (5) and (6) at time point (0') is assumed, the synthesized wave of (5) and (6) is oscillation of which the phase is advanced by π/2.

Therefore, if the time difference between (0) and (0') is an even multiple of π/2(AL), for example, 2 AL, the synthesized wave of (1), (2), (3), and (4) and the synthesized wave of (5) and (6) have opposite phases and weaken each other. Also, if the time width Cp of (5) and (6) is AL, the amplitude of the synthesized wave of (5) and (6) is maximized. Also, by causing the time widths of (5) and (6) to be less than or greater than AL, the amplitude of the synthesized wave (cancellation waveform) of (5) and (6) can be adjusted. Therefore, by the setting of the time width Cp of (5) and (6), the residual oscillation due to the synthesized waves of (1), (2), (3) and (4) can be cancelled out by the synthesized waves of (5) and (6).

By setting the cancellation waveform of the trapezoidal or rectangular wave to the stair-like ejection waveform as above, it is possible to prevent the liquid droplet by the next ejection waveform after the cancellation waveform from receiving the influence of the residual oscillation caused by the main acoustic oscillation generated by the previous ejection waveform.

Next, the conditions of the time width Cp of (5) and (6) under which the parasitic oscillation of the cycle λn weakens each other is described. First, oscillation of the cycle λn generated by the waveform of (5) at the time of the first potential difference change is set as A5, and an oscillation vector after the time (i.e., the waveform width of cancellation waveform) Cp of A5 is set as A5'. After Cp, the oscillation vector of the cycle λn generated by the waveform of (6) at the time of the second potential difference change is set as A6. Since the voltage changes in (5) and (6) are opposite, if Cp is an integer multiple of λn (i.e., the phase difference between A5' and A6 is 180 degrees), the absolute value of the composite vector of A5' and A6 is the minimum. If a condition in which the absolute value of the composite vector of A5' and A6 from an expression for synthesizing the simple harmonic motion of the cycle λn is less than the larger of the absolute values of A5' and A6 is obtained, the phase difference between the oscillation vectors A5' and A6 becomes within 180 degrees±60 degrees.

Therefore, the condition in which the parasitic oscillation of the cycle an weakens each other is:

$$(kk-1/6)\ \lambda n \le Cp \le (kk+1/6)\ \lambda n.$$

Here, kk is an integer of 1 or more.

Therefore, by setting the time widths Cp of (5) and (6) under the above conditions, the cancellation waveform can suppress the parasitic oscillation generated by the cancellation waveform, and thus it is possible to prevent the residual oscillation by the cancellation waveform from giving the influence to the liquid droplet ejected by the next ejection waveform.

Note that, with respect to the main acoustic oscillation, the time interval of (0) and (0') if the residual oscillation of the ejection waveform is cancelled by the cancellation waveform is set as 3 AL in the example of FIG. 6. However, if the pressure is reduced first, and then pressurization is performed in the cancellation waveform ((5) and (6)) as in the ejection waveform ((1), (2), (3), and (4)), if the condition in which oscillation having the cycle of 2 AL weakens each other in the synthesized wave of (1), (2), (3), and (4) and synthesized wave of (5) and (6) is obtained similarly as in the case of the cycle λn from the expression of the synthesis of the simple harmonic motion, $$(kkkk/2-1/6)\,2\ AL \le \text{time interval of (0) and (0')} \le (kkkk/2+1/6)\ 2\ AL$$

is satisfied, and kkkk here becomes an odd number of 1 or more.

Also, in the example of FIG. 15, the time interval of (0) and (0') is set as 2 AL. However, since the pressurization is performed first, and then the pressure is reduced in the cancellation waveform ((5) and (6)), on the contrary to the ejection waveform ((1), (2), (3), and (4)), if the condition in which the oscillation having the cycle of 2 AL weakens each other for the synthesized wave of (1), (2), (3), and (4) and the synthesized wave of (5) and (6) is obtained as in the case of the cycle λn from the expression of the synthesis of the simple harmonic motion, $$(kkkk-1/6)\,2\ AL \le \text{time interval of (0) and (0')} \le (kkkk+1/6)\ 2\ AL$$

is satisfied, and kkkk here is an integer of 1 or more.

In the example of FIG. 6, the residual oscillation by the ejection waveform can be cancelled by the cancellation waveform by adjusting the time interval of (0) and (0') as in the above condition, in each case of the cancellation waveform in which the pressure is reduced first, and then the pressurization is performed similarly to the ejection waveform and the cancellation waveform in which the pressurization is performed first and then the pressure is reduced on the contrary to the ejection waveform of FIG. 15.

By the liquid ejection head 1 described above, the residual oscillation of the ejection waveform can be suppressed by the cancellation waveform.

Note that, embodiments of this disclosure are not limited to the examples described above. In the examples described above, the drive waveform used in the liquid ejection head 1 includes one intermediate potential difference, but the embodiments are not limited thereto. The drive waveform may have one or more intermediate potential differences.

Hereinafter, as another embodiment, the drive waveform of the liquid ejection head 1 of which the potential difference (i.e., the expansion potential difference) of the drive waveform of the drive circuit 70 is increased h times of two or more times consecutively is described with reference to FIGS. 16 and 17.

In the ejection waveform of the liquid ejection head 1 according to the present embodiment, if one of the first to h−1-th the potential difference changes is set as the i-th potential difference change, one of the i+1-th to h-th potential difference changes is set as the j-th potential difference change, and the time interval of the i-th and the j-th potential difference change start time is set as Tij, any of the time intervals Tij is:

$$(k/2-1/6)\ \lambda n \le Tij \le (k/2+1/6)\ \lambda n. \qquad \text{(Numerical Expression 7)}$$

Here, k is an odd number of 1 or more.

According to the ejection waveform that satisfies Numerical Expression 7, the parasitic oscillation of the cycle λn that occurs by two or more times of the corresponding potential difference change weakens each other, and the parasitic oscillation of the cycle λn that occurs in the pressure chamber can be suppressed. This is applied in the same manner to a case where the number of times of the contraction and change of the pressure chamber 46 is h times of three or more times.

Also, when i+1=j, that is, when Tij is a time interval of the consecutive potential difference changes, if the reduction of the power consumption is considered, the time interval Tij is:

$$(k/2-1/6)\ \lambda n \le Tij \le k\lambda n/2. \qquad \text{(Numerical Expression 8)}$$

Here, k is an odd number of 1 or more.

Also, in all the first to h-th potential difference changes, if the time interval Tij satisfies $(k/2-1/6)\ \lambda n \le Tij \le (k/2+1/6)\ \lambda n$ (k is an odd number of 1 or more), or there is another potential difference change that satisfies $(k/2-1/6)\ \lambda n \le Tij \le k\lambda n/2$ (k is an odd number of 1 or more), the ejection waveform can further suppress the parasitic oscillation of the cycle λn occurring in the pressure chamber 46.

Also, by causing the potential difference change amounts of the i-th and j-th potential difference changes that become the time intervals Tij satisfying $(k/2-1/6)\ \lambda n \le Tij \le (k/2+1/6)\ \lambda n$ (k is an odd number of 1 or more) to be the same, the residual oscillation derived from the parasitic oscillation can be further suppressed thereafter. More preferably, since the optimum holding time of each step in a case where it is assumed that the potential differences of the steps are the same, and the pressure oscillation is not attenuated is λn/the number of steps (h), the time interval Tij of all the consecutive potential difference changes may be λn/the number of steps (h).

Also, in view of reducing the power consumption by causing the main acoustic oscillation to strengthen each other, in the ejection waveform, if the number of times of the potential difference change that consecutively expands and changes the pressure chamber is h times of two times or more, the time interval Tij between the first potential difference change and the h-th time of potential difference change is desirably within 0.5 times of the main acoustic oscillation cycle. This is because, if the time interval Tij of the first potential difference change and the h-th potential difference change is within 0.5 times of the main acoustic oscillation cycle, the main acoustic oscillation occurring due to all the first to h-th potential difference changes strengthens each other, and contributes to the reduction of the power consumption.

Figure 16:
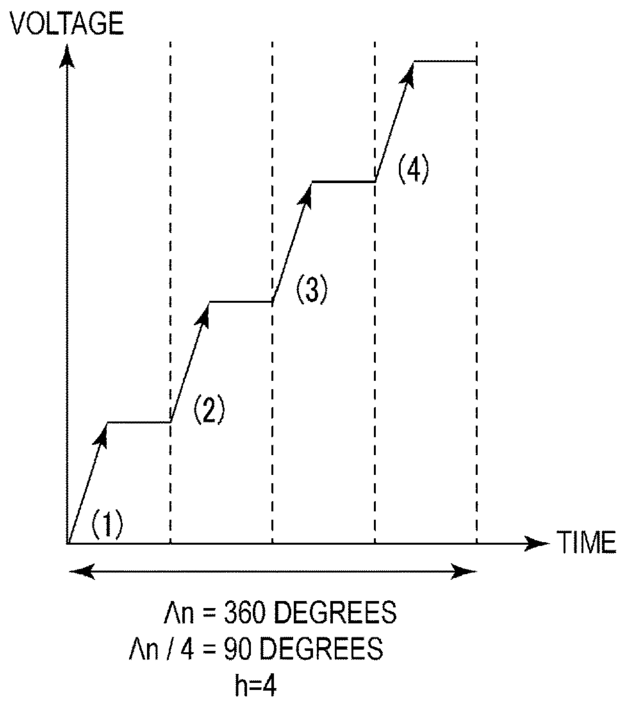
FIG. 16 is an explanatory diagram of an example of the drive waveform according to another embodiment.
Figure 17:
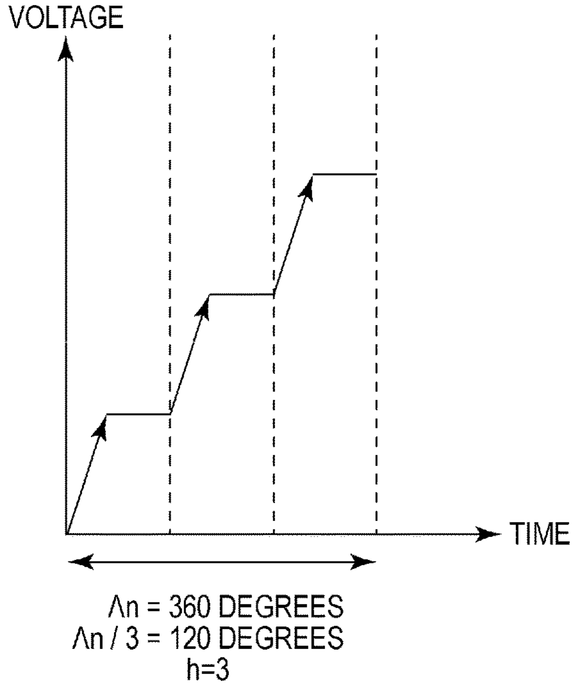
FIG. 17 is an explanatory diagram illustrating an example of the drive waveform according to another embodiment.

As an example of the ejection waveform described above, an example in which the number of steps is set as four steps in the rising waveform is illustrated in FIG. 16, and an example in which the number of steps of the rising waveform is set as three steps is illustrated in FIG. 17. In FIG. 16, h that is each number of steps is illustrated in parentheses. Note that it is obvious that the same may be applied to the falling waveform. As illustrated in FIGS. 16 and 17, the optimum holding time of each step in a case where it is assumed that the potential difference of each step is the same, and the pressure oscillation is not attenuated becomes λn/the number of steps (h). Therefore, in the potential difference displacements from the first step to the h-th step, if any two phase differences or time intervals are in the range of $(k/2-1/6)\ \lambda n$ to $(k/2+1/6)\ \lambda n$, the parasitic oscillation occurring due to the two corresponding potential difference displacements weakens each other. For example, the time interval of the first to third potential difference displacements of FIG. 16 becomes λn/2, Tij when i=1, and j=3 satisfies Numerical Expression 7. Also, the time intervals of the second and fourth potential difference displacements of FIG. 16 become λn/2, and Tij when i=2, and j=4 also satisfies Numerical Expression 7. Therefore, the parasitic oscillation weakens each other.

Note that the pressure oscillation in the pressure chamber 46 is attenuated over time due to the viscous resistance of the ink. Also, parasitic oscillation is generally more attenuated over time than main acoustic oscillation. For this reason, the potential difference change from 0.5 AL before ejection to immediately after ejection gives greater influence on satellites and print quality than the potential difference change in the time range from 1.5 AL before ejection to 0.5 AL before ejection. The potential difference change from 1.5 AL to 0.5 AL before ejection (the range in which the main acoustic oscillation described above strengthen each other) gives a greater influence on satellites and print quality than the potential difference change in the time range before 1.5 AL. Therefore, in the ejection waveform, it is desirable that the value of Tm or Tij, which is closer to immediately before or after the ejection, is adjusted so that a condition in which the parasitic oscillation weakens each other is satisfied among the intervals of the potential difference change time of any two times.

Also, even if such an ejection waveform has three or more steps, if the waveform is symmetrical in the front-rear direction, it can be considered that oscillation caused by the phase of the synthesized wave of the ejection waveform is oscillation of which the phase is advanced by −π/2 if the center position (0) of the symmetrical shape is used as the phase reference. Therefore, even if the ejection waveform has three or more steps, the cancellation waveform can weaken the residual oscillation by inputting the synthesized waves of (5) and (6), which have the opposite phase to the ejection waveform.

According to the liquid ejection head of at least one embodiment described above, the residual oscillation generated by the ejection waveform can be suppressed by using the cancellation waveform.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate including a nozzle that ejects a liquid;

a pressure chamber that communicates with the nozzle;

an actuator configured to vary a volume of the pressure chamber in response to a driving signal; and a drive circuit configured to generate the driving signal, wherein the driving signal includes:

an ejection waveform for ejecting the liquid and causing:

an expansion potential difference for expanding the volume of the pressure chamber, a contraction potential difference for contracting the volume of the pressure chamber, and one or more intermediate potential differences between the expansion potential difference and the contraction potential difference, and a cancellation waveform that includes a trapezoidal wave for suppressing residual oscillation after the ejection of the liquid, and wherein the ejection waveform cancels oscillation of an acoustic resonance frequency of a frequency region higher than a main acoustic resonance frequency of the liquid in the pressure chamber that occurs by a change in a potential difference.

2. The liquid ejection head according to claim 1, wherein a waveform width of the cancellation waveform (Cp) satisfies the following condition:

$$(kk-1/6)\ \lambda n \leq Cp \leq (kk+1/6)\ \lambda n,$$

where kk is an integer of 1 or more, and λn is a cycle of the oscillation.

3. The liquid ejection head according to claim 1, wherein the acoustic resonance frequency is substantially an odd number multiple of the main acoustic resonance frequency, where the odd number is greater than or equal to 3.

4. The liquid ejection head according to claim 1, wherein the drive circuit includes a switching circuit that is connected to an electrode of the actuator and a plurality of voltage sources, the switching circuit being configured to switch the connection of the electrode to the voltage sources, and thereby generating the expansion potential difference, the intermediate potential difference, and the contraction potential difference.

5. The liquid ejection head according to claim 1, wherein the volume of the pressure chamber is changed by a potential difference generated between electrodes of the actuator.

6. A liquid ejection head, comprising:

a nozzle plate including a nozzle that ejects a liquid;

a pressure chamber that communicates with the nozzle;

an actuator configured to vary a volume of the pressure chamber in response to a driving signal; and a drive circuit configured to generate the driving signal, wherein the driving signal has a waveform including:

a first period in which the volume of the pressure chamber is expanded, a second period after the first period and in which the volume of the pressure chamber is expanded, a third period after the second period and in which the volume of the pressure chamber is contracted, a fourth period after the third period and in which the volume of the pressure chamber is contracted, a fifth period after the fourth period and in which the volume of the pressure chamber is contracted, and a sixth period after the fifth period and in which the volume of the pressure chamber is expanded, and wherein a time interval between a beginning of the fifth period and a beginning of the sixth period (Cp) satisfies the following condition:

$$(kk-1/6)\ \lambda n \leq Cp \leq (kk+1/6)\ \lambda n,$$

where kk is an integer of 1 or more, and λn is a cycle of oscillation of an acoustic resonance frequency of a frequency region higher than a main acoustic resonance frequency of the liquid in the pressure chamber that occurs by a change in a potential difference.

7. The liquid ejection head according to claim 6, wherein a time interval between a beginning of the first period and a beginning of the second period is λn/2, where λn is a cycle of oscillation of an acoustic resonance frequency of a frequency region higher than a main acoustic resonance frequency of the liquid in the pressure chamber that occurs by a change in a potential difference.

8. The liquid ejection head according to claim 6, wherein a time interval between the beginning of the third period and a beginning of the fourth period is λn/2.

9. The liquid ejection head according to claim 8, wherein the time interval between the beginning of the third period and the beginning of the fourth period is substantially equal to a time interval between the beginning of the second period and a beginning of the fourth period, divided by three.

10. The liquid ejection head according to claim 6, wherein a time interval between a beginning of the fifth period and a beginning of the sixth period is λn.

11. The liquid ejection head according to claim 6, wherein the acoustic resonance frequency is substantially an odd number multiple of the main acoustic resonance frequency, where the odd number is greater than or equal to 3.

12. A printing device, comprising:

a cassette in which a sheet is stored; and an image forming unit configured to form an image on the sheet and including:

a nozzle plate including a nozzle that ejects ink, a pressure chamber that communicates with the nozzle, an actuator configured to vary a volume of the pressure chamber in response to a driving signal, and a drive circuit configured to generate the driving signal, wherein the driving signal includes:

an ejection waveform for ejecting the ink and causing:

an expansion potential difference for expanding the volume of the pressure chamber, a contraction potential difference for contracting the volume of the pressure chamber, and one or more intermediate potential differences between the expansion potential difference and the contraction potential difference, and a cancellation waveform that includes a trapezoidal wave for suppressing residual oscillation after the ejection of the ink, and wherein the ejection waveform cancels oscillation of an acoustic resonance frequency of a frequency region higher than a main acoustic resonance frequency of the ink in the pressure chamber that occurs by a change in a potential difference.

13. The printing device according to claim 12, wherein a waveform width of the cancellation waveform (Cp) satisfies the following condition:

$$(kk-1/6)\ \lambda n \leq Cp \leq (kk+1/6)\ \lambda n,$$

where kk is an integer of 1 or more, and λn is a cycle of the oscillation.

14. The printing device according to claim 12, wherein the acoustic resonance frequency is substantially an odd number multiple of the main acoustic resonance frequency, where the odd number is greater than or equal to 3.

15. The printing device according to claim 12, wherein the drive circuit includes a switching circuit that is connected to an electrode of the actuator and a plurality of voltage sources, the switching circuit being configured to switch the connection of the electrode to the voltage sources, and thereby generating the expansion potential difference, the intermediate potential difference, and the contraction potential difference.

16. The printing device according to claim 12, wherein the volume of the pressure chamber is changed by a potential difference generated between electrodes of the actuator.

* * * * *